(12) United States Patent
Tsukamoto

(10) Patent No.: US 11,173,794 B2
(45) Date of Patent: Nov. 16, 2021

(54) PARKING ASSISTANCE METHOD AND PARKING ASSISTANCE DEVICE

(71) Applicant: Nissan Motor Co., Ltd., Yokohama (JP)

(72) Inventor: Yukinori Tsukamoto, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 16/479,682

(22) PCT Filed: Jan. 30, 2017

(86) PCT No.: PCT/JP2017/003148
§ 371 (c)(1),
(2) Date: Jul. 22, 2019

(87) PCT Pub. No.: WO2018/138907
PCT Pub. Date: Aug. 2, 2018

(65) Prior Publication Data
US 2020/0406774 A1 Dec. 31, 2020

(51) Int. Cl.
*H01F 27/42* (2006.01)
*H01F 37/00* (2006.01)
(Continued)

(52) U.S. Cl.
CPC ............. *B60L 53/12* (2019.02); *B60L 53/126* (2019.02); *B60L 53/36* (2019.02); *B60L 53/39* (2019.02); *B60L 53/66* (2019.02); *H02J 50/12* (2016.02); *H02J 50/80* (2016.02); *H02J 50/90* (2016.02); *H01F 38/14* (2013.01)

(58) Field of Classification Search
CPC ........ B60L 53/36; B60L 53/39; B60L 53/126; B60L 53/66; B60L 53/12; H02J 50/80; H02J 7/00032; H02J 50/12; H02J 7/04; H02J 50/90; H02J 2207/20
See application file for complete search history.

(56) References Cited

U.S. PATENT DOCUMENTS 9,472,973 B2 10/2016 Nakagawa et al.
10,432,039 B2 10/2019 Mo et al.
(Continued)

FOREIGN PATENT DOCUMENTS

JP 2010-183814 8/2010
JP 2011-254633 A 12/2011
(Continued)

*Primary Examiner* — Hal Kaplan
*Assistant Examiner* — Rasem Mourad
(74) *Attorney, Agent, or Firm* — Foley & Lardner LLP

(57) ABSTRACT

The parking assistance method includes: measuring a first received voltage generated in a receiving coil; and assisting alignment between coils by presenting to a vehicle occupant a result of having determined whether or not power can be supplied on the basis of a potential difference previously obtained and the first received voltage. The previously obtained potential difference is a potential difference between a second received voltage of the receiving coil measured when the alignment between the coils is executed before assisting the alignment between the coils, and a third received voltage of the receiving coil measured after the alignment and the power supply are completed.

9 Claims, 18 Drawing Sheets

(51) Int. Cl.
- *H01F 38/00* (2006.01)
- *B60L 53/12* (2019.01)
- *H02J 50/80* (2016.01)
- *H02J 50/90* (2016.01)
- *H02J 50/12* (2016.01)
- *B60L 53/126* (2019.01)
- *B60L 53/66* (2019.01)
- *B60L 53/36* (2019.01)
- *B60L 53/39* (2019.01)
- *H01F 38/14* (2006.01)

(56) References Cited

U.S. PATENT DOCUMENTS

| | | | |
|---|---|---|---|
| 2010/0201204 A1 | 8/2010 | Sakoda et al. | |
| 2015/0217647 A1* | 8/2015 | Ichikawa | B60L 53/67 320/108 |
| 2015/0352963 A1* | 12/2015 | Grabar | H02J 7/025 320/108 |
| 2016/0064988 A1 | 3/2016 | Ku et al. | |
| 2017/0129358 A1* | 5/2017 | Taniguchi | B60L 53/38 |
| 2018/0026483 A1 | 1/2018 | Mo et al. | |

FOREIGN PATENT DOCUMENTS

| | | |
|---|---|---|
| JP | 2013-5539 | 1/2013 |
| JP | 5377119 B2 | 12/2013 |
| JP | 2016-086593 A | 5/2016 |
| JP | 2016-182002 A | 10/2016 |
| WO | WO-2016/121044 A1 | 8/2016 |

\* cited by examiner

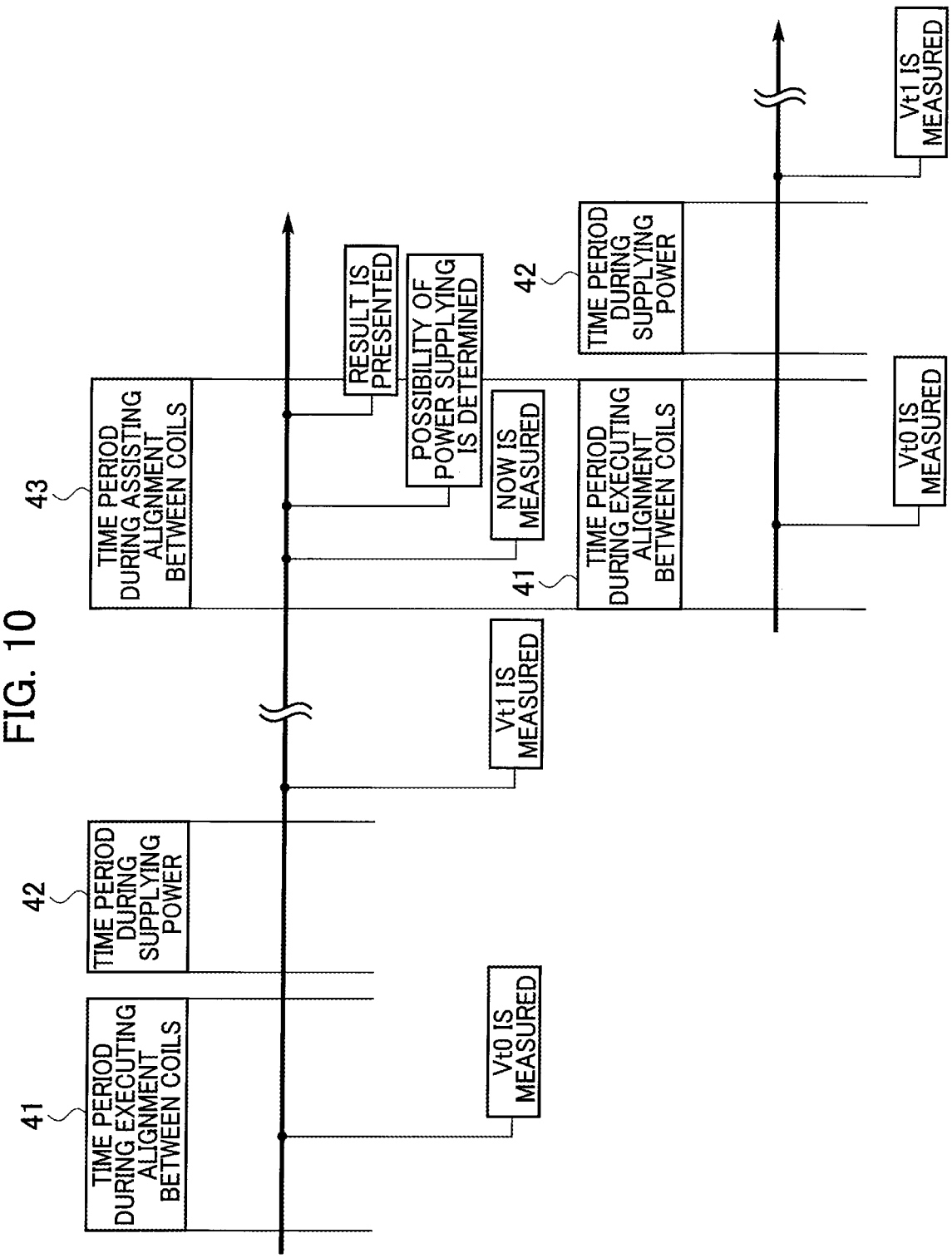

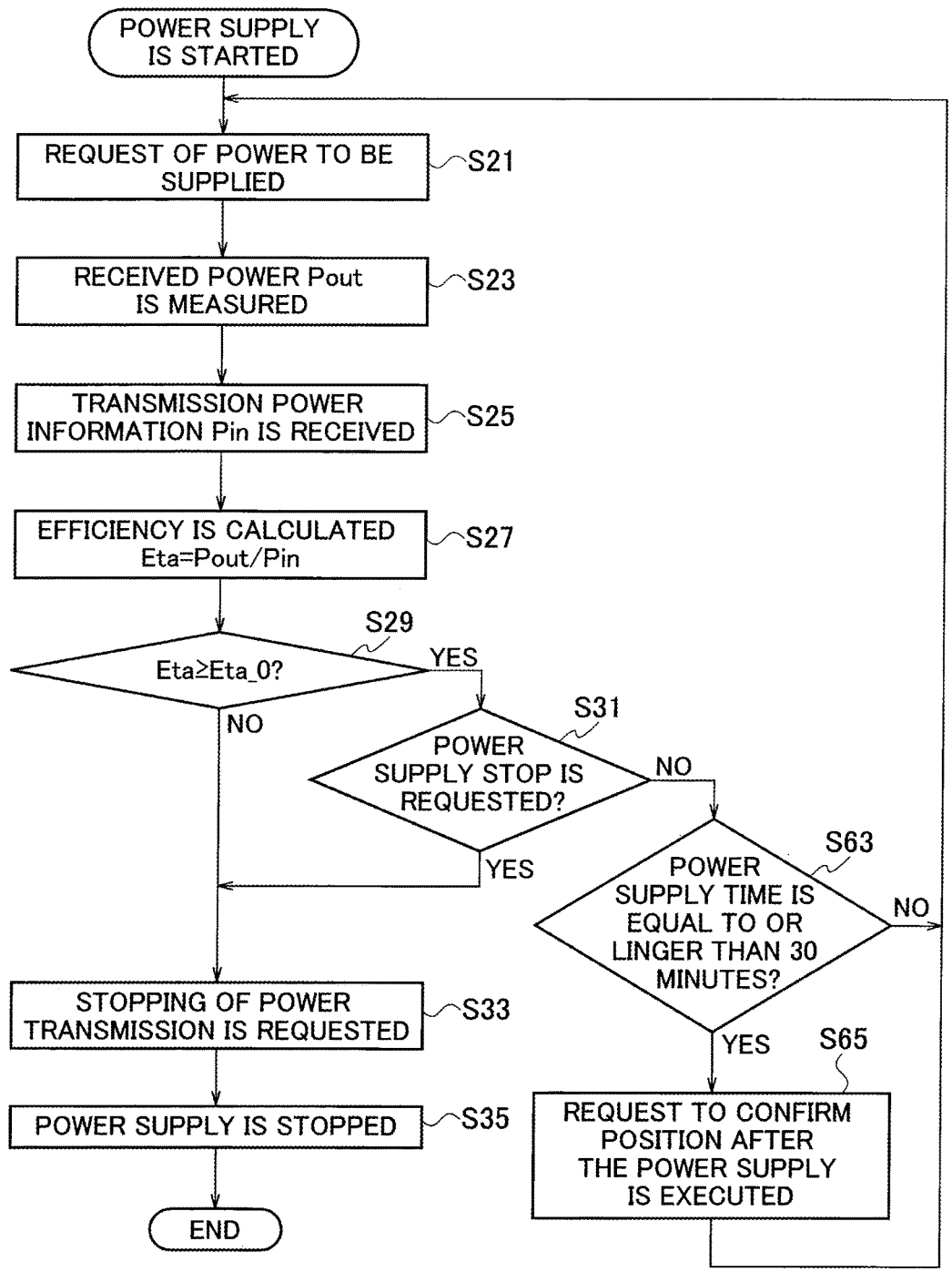

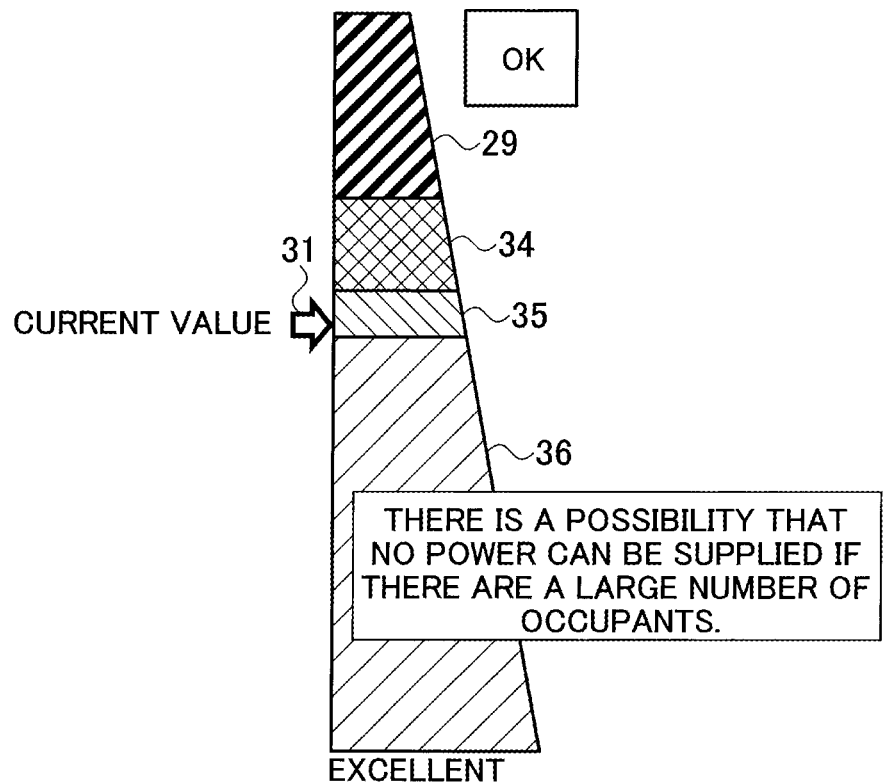
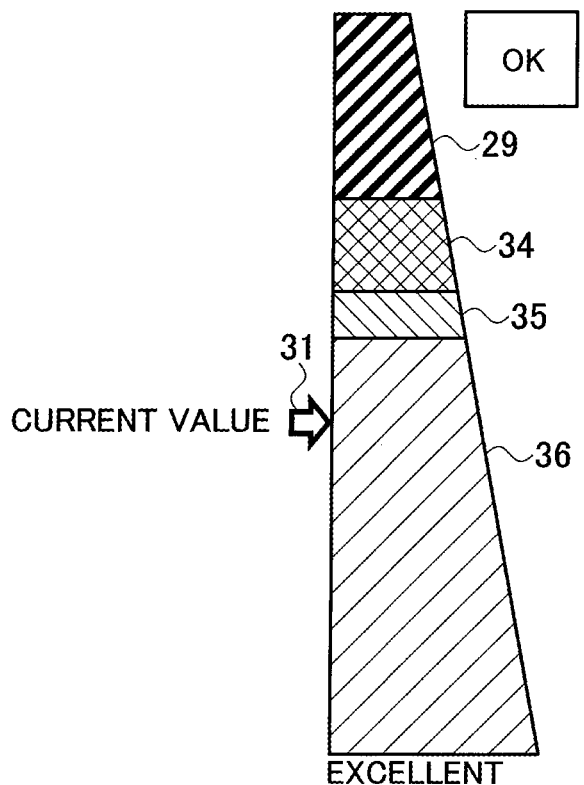

PARKING ASSISTANCE METHOD AND PARKING ASSISTANCE DEVICE

TECHNICAL FIELD

The present invention relates to a parking assistance method and a parking assistance device for determining a coil position capable of supplying electric power in consideration of a fluctuation of a gap between wireless power supply coils.

BACKGROUND ART

Conventionally, a parking assistance device in wireless power supply has been proposed (Refer to Patent Literature 1). In Patent Literature 1, an image captured by a rear camera is displayed to guide a vehicle, when the vehicle is rolling backward to be parked. After a ground-side unit is not captured in the image, the vehicle is guided by calculating and displaying the amount of position misalignment between the ground-side unit and a vehicle-side unit, in accordance with a voltage value measured by the vehicle-side unit.

CITATION LIST

Patent Literature

Patent Literature 1: Japanese Patent No. 5377119

SUMMARY OF INVENTION

Technical Problem

By the way, there is an allowable range for supplying power (power-supply allowable range), in the amount of the position misalignment. The power-supply allowable range is greatly dependent on a distance (i.e., a gap) in the vertical direction between the ground-side unit and the vehicle-side unit. Since the gap changes due to getting on and off of an occupant or loading and unloading of the cargo, the gap may change from a state where the power can be supplied to a state where the power cannot be supplied. On the other hand, if the fluctuation range of the gap is overestimated, the power-supply allowable range cannot be widely set, and thereby the convenience of parking becomes low.

The present invention has been made in light of the above-mentioned problem, and the object of the present invention is to provide a parking assistance method and a parking assistance device capable of extending a power-supply allowable range in a wireless power supply, and thereby capable of improving convenience of parking.

Solution to Problem

The parking assistance method and the parking assistance device according to one aspect of the present invention includes: measuring a first received voltage generated in a receiving coil; and assisting alignment between coils by presenting to a vehicle occupant a result of having determined whether or not power can be supplied on the basis of a potential difference previously obtained and the first received voltage. The previously obtained potential difference is a potential difference between a second received voltage of the receiving coil measured when the alignment between the coils is executed before assisting the alignment between the coils, and a third received voltage of the receiving coil measured after the alignment and the power supply are completed.

Advantageous Effects of Invention

According to the one aspect of the present invention, the power-supply allowable range in the wireless power supply can be extended, and thereby the convenience of the parking can be improved.

BRIEF DESCRIPTION OF DRAWINGS

FIG. 10 is a conceptual diagram showing an overlapping possibility between a time period 43 for assisting alignment between coils, and a time period 41 for previously measuring a received voltage (Vt0: second received voltage) for next alignment assisting.

FIG. 11B is a flow chart for explaining an operation from starting to stopping of the wireless power supply in the second embodiment.

FIG. 13B is a diagram showing another example of an image indicating that the power cannot be supplied (image indicating "N.G. position" (improper position)), displayed on the display unit 5 in Step S59 shown in FIG. 11A.

FIG. 13C is a diagram showing another example of an image indicating that the power can be supplied (image indicating "O.K. position" (proper position)), displayed on the display unit 5 in Step S61 shown in FIG. 11A.

DESCRIPTION OF EMBODIMENTS

Hereinafter, there will be explained embodiments with reference to the plurality of drawings. Note that although a configuration of the parking assistance method and the parking assistance device will now be schematically explained hereinafter, these schematic diagrams may exaggeratingly draw a relationship between a thickness and a planar dimension, and a ratio between vertical and horizontal dimensions in the plane, etc., in order to facilitate understanding.

First Embodiment

[Wireless Power Supply System]

Figure 1:
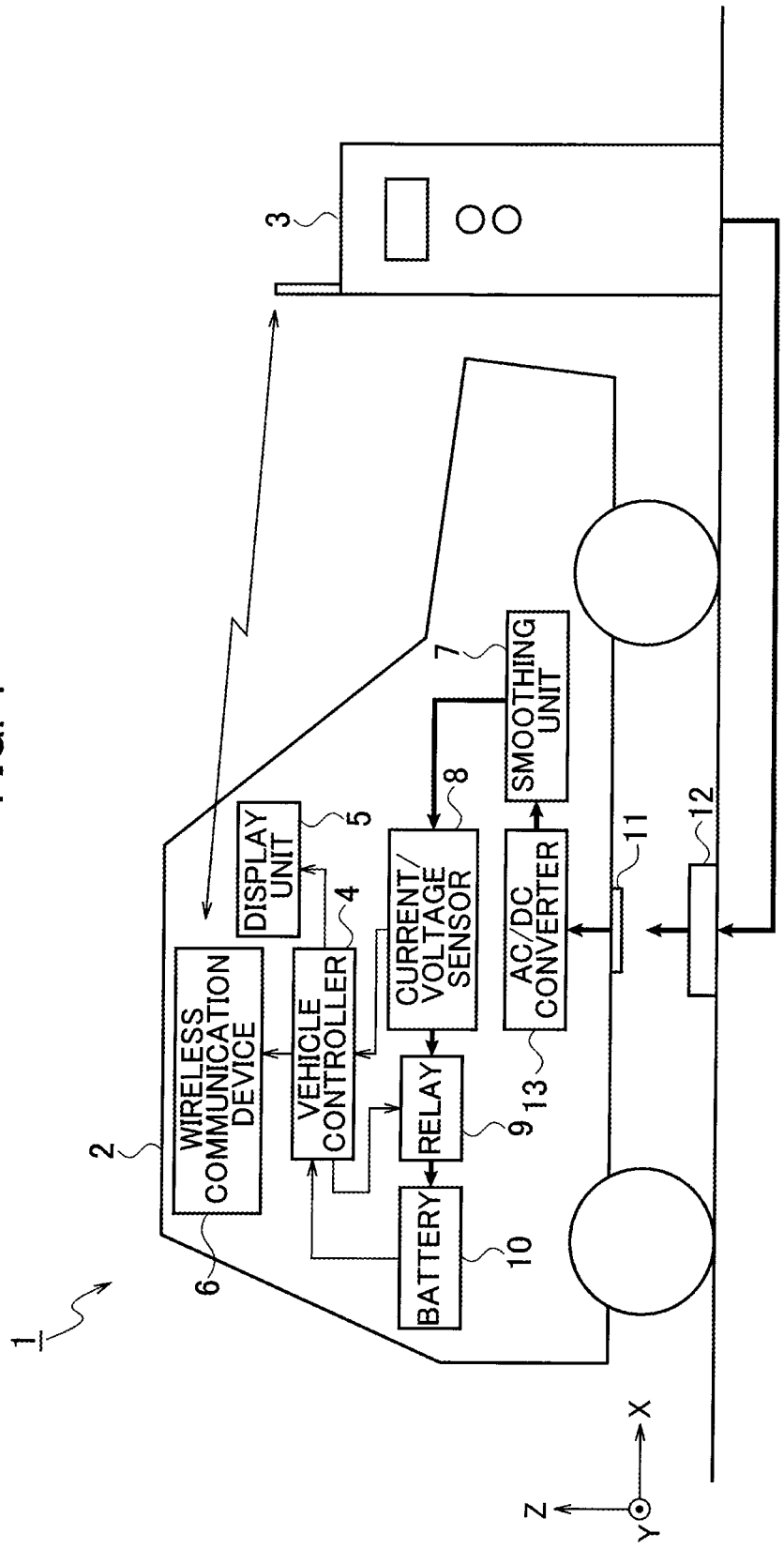
FIG. 1 is a block diagram showing a configuration of a wireless power supply system according to embodiments.

First, with reference to FIG. 1, there will now be explained a wireless power supply system to which the parking assistance method and the parking assistance device according to the embodiments are applied. FIG. 1 is a schematic diagram showing a schematic of the wireless power supply system, and an orthogonal coordinate system of a three-dimensional space is defined, in which an X-Y plane including an X-axis and a Y-axis is a horizontal plane, and a Z-axis direction is a direction perpendicular to the horizontal plane.

The wireless power supply system is a system configured to supply power in wireless between a ground-side coil 12 and a vehicle-side coil 11. More specifically, the wireless power supply system is a systems capable of supplying the power in wireless from a power transmission coil (ground-side coil 12) embedded under a road to a receiving coil (vehicle-side coil 11) mounted near a bottom surface of a vehicle 2, by means of electromagnetic induction and resonance phenomena, when the vehicle is stopped. Since the power which is supplied is alternating current power, the power is converted into direct current power by an AC/DC converter 13 and is smoothed by a smoothing unit 7, and then is transmitted to a battery 10 (including a secondary battery) through a current/voltage sensor 8 (voltage sensor) and a relay switch 9. The battery 10 is charged with this transmitted power. The thick arrow which connects from the ground-side coil 12 to the battery 10 in FIG. 1 indicates the flow of the power to be supplied.

As information indicating a power supply state, a signal indicating a charging current value or charging voltage value measured by the current/voltage sensor 8 is transmitted from the current/voltage sensor 8 to a vehicle controller 4. A signal indicating a state of charge (SOC) or situation of remaining capacity of the battery 10 is transmitted from the battery 10 to the vehicle controller 4. The vehicle controller 4 controls connection and disconnection (ON/OFF) of the relay switch 9 on the basis of these transmitted signals, and transmits the information to a ground-side power source box 3 through a wireless communication device 6.

On the other hand, the wireless power supply system includes a ground-side power source box 3 and a ground-side coil 12, as a configuration at a side of the ground. The ground-side power source box 3 includes: a power unit configured to convert the AC power supplied from a line power source into an AC voltage, an AC current, and an AC cycle to be used for the wireless power supply, and to transmit the converted AC power to the ground-side coil 12; a ground controller configured to control an operation of the power unit; and a communication unit configured to execute wireless communications with the wireless communication device 6 mounted in the vehicle 2. The ground-side coil 12 supplies the AC power transmitted from the power unit in wireless to the vehicle-side coil 11 by means of the electromagnetic induction and the resonance phenomena. The signal indicating the power supply state, and the state of charge (SOC) and situation of remaining capacity of the battery 10 which is transmitted from the wireless communication device 6 at the side of the vehicle is received by the communication unit. The received signal is transmitted to the ground controller; and the ground controller controls the conversion of the AC power executed by the power unit and the power transmission to the ground-side coil 12 on the basis of this signal. In this way, the wireless power supply system can supply the power in wireless between the ground-side coil 12 and the vehicle-side coil 11, and thereby can charge the battery 10 mounted in the vehicle 2.

[Parking Assistance Device]

Next, there will now be explained the parking assistance device according to the embodiment to be applied to the wireless power supply system. In order to execute the above-mentioned wireless power supply, it is necessary to previously align a position of the vehicle 2 (particularly, a position of the vehicle-side coil 11) with respect to the ground-side coil 12. The parking assistance device assists an alignment operation between the coils, i.e., the parking operation, executed by an occupant of the vehicle 2 which is a user of the parking assistance device. In other words, the parking assistance method and the parking assistance device according to the embodiments assist the alignment between the coils when parking the vehicle 2 in a parking space provided with the power transmission coil (ground-side coil 12), before supplying the power in a wireless manner to the receiving coil (vehicle-side coil 11) mounted in the vehicle 2.

More specifically, the parking assistance device can be configured as a part of the vehicle controller 4. The parking assistance device measures a voltage (received voltage) generated in the vehicle-side coil 11 by means of the current/voltage sensor 8 shown in FIG. 1, when the ground-side coil 12 is excited. The received voltage increases as the distance between the ground-side coil 12 and the vehicle-side coil 11 in the three-dimensional space decreases. The parking assistance device assists the alignment between the coils by determining a possibility of power supplying on the basis of the value of the received voltage, and presenting the determination result to the occupant of the vehicle 2. For example, an image indicating information with regard to the coil position is displayed on a display (display unit 5) mounted in a dashboard of the vehicle 2. In addition, a range of an amount of position misalignment between the coils (11, 12) allowed to supply the power (power-supply allowable range) is previously set on the basis of a threshold value (V0: minimum allowable voltage) of the received voltage.

The power-supply allowable range is largely dependent on the distance in a vertical direction (Z-axial direction) between the ground-side coil 12 and the vehicle-side coil 11. The distance in the vertical direction (Z-axial direction) between the ground-side coil 12 and the vehicle-side coil 11 is referred to as "gap." For example, the partial drawing at the lower left of FIG. 2 is a diagram showing the ground-side coil 12 and the vehicle-side coil 11 when the ground is viewed from the vehicle 2 side along the Z-axis, and the partial drawing at the upper left of FIG. 2 is a cross-sectional diagram of the partial drawing at the lower left of FIG. 2 taken in the line A-A.

Since a coupling coefficient between the coils increases and power supply efficiency also increases when the gap is small, the power-supply allowable range 21 in the X-Y plane also increases. That is, the position misalignment between the coils in the X-axial direction or Y-axial direction that affects the power supply can be allowed. For example, since center 11cb of the vehicle-side coil 11b is positioned within the power-supply allowable range 21 even if the position misalignment (X deviation) in the X-axial direction occurs, as shown in the vehicle-side coil 11b in FIG. 2, the parking assistance device determines that the power supply can be started.

Figure 2:
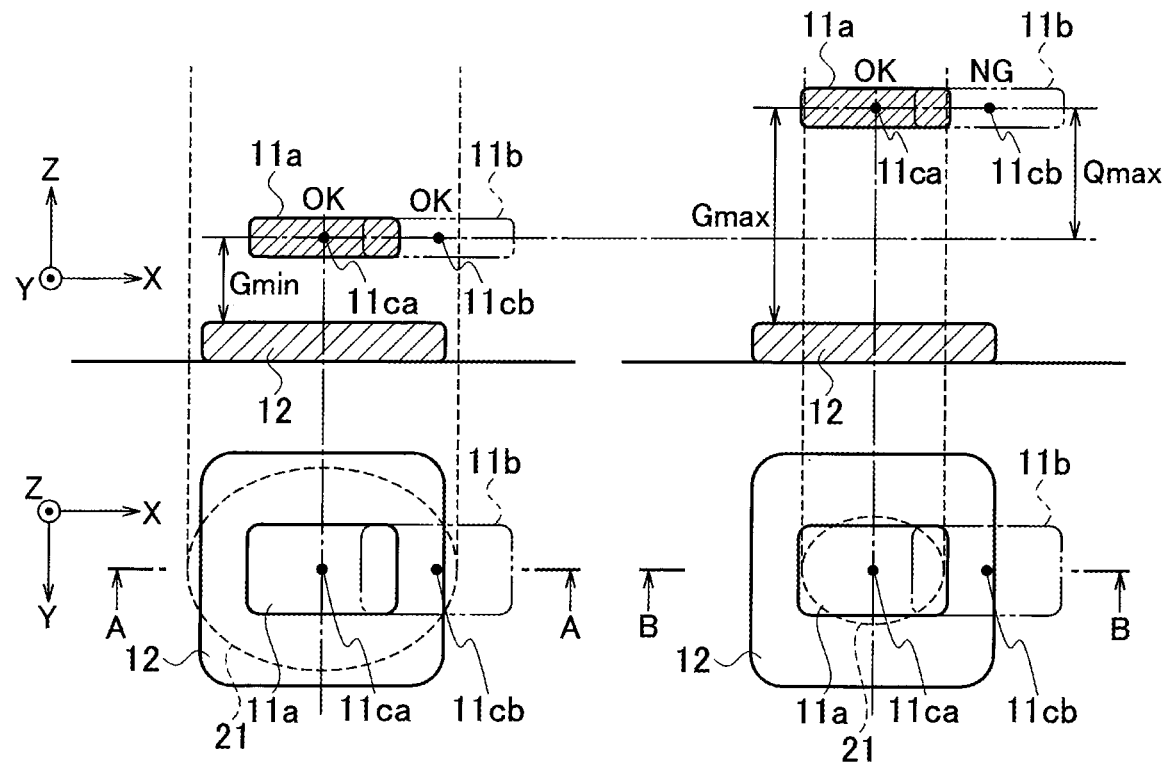
FIG. 2 is a diagram showing a relationship between a position of a vehicle-side coil 11 and a power-supply allowable range 21 in the cases where a gap between the coils is small and large.

The "power-supply allowable range 21" in FIG. 2 indicates a range which can be taken by the center 11ca of the vehicle-side coil 11a using an orthogonal coordinate system, with reference to the center of the ground-side coil 12. In other words, the parking assistance device detects the same received voltage as the minimum allowable voltage (V0) when the center IIea of the vehicle-side coil 11a is positioned at an outer edge of the power-supply allowable range 21, and the parking assistance device detects a received voltage higher than the minimum allowable voltage (V0), inside the outer edge of the power-supply allowable range 21.

On the other hand, as shown in the partial drawings at the upper right side and the lower right of FIG. 2 when the gap is large, the coupling coefficient between the coils decreases and therefore the power supply efficiency is reduced, even if the position misalignment in the Y-axial direction or X-axial direction is equal thereto. Accordingly, the power-supply allowable range 21 in the X-Y plane is reduced. The partial drawing at the upper right of FIG. 2 is a cross-sectional diagram of the partial drawing at the lower right of FIG. 2 taken in the line B-B. For example when the gap is large, since the center 11cb of the vehicle-side coil 11b shown in FIG. 2 is positioned outside the power-supply allowable range 21, the parking assistance device determines that the power supply cannot be started.

Figure 3:
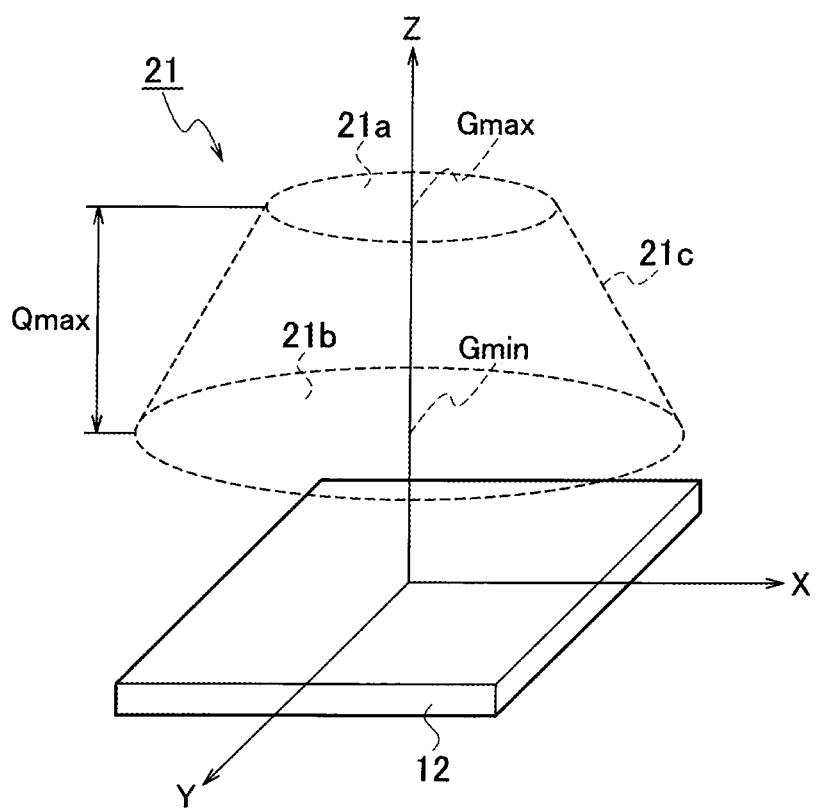
FIG. 3 is a perspective diagram showing an example of an outside shape of the power-supply allowable range 21 in consideration of a Z-axial direction.

As shown in FIG. 3, the size of the power-supply allowable range 21 in the X-Y plane is changed in accordance with the distance (gap) between the coils in the Z-axial direction. Since a coupling coefficient between the coils increases and power supply efficiency also increases as the gap is small, the power-supply allowable range 21 in the X-Y plane also increases. The shape of the power-supply allowable range 21 in the X-Y plane is changed in accordance with the shapes and the numbers of the vehicle-side coil 11 and the ground-side coil 12, and the arrangement of the magnetic material and the nonmagnetic material existing around the coil. Therefore, although the power-supply allowable range 21 is shown in a precise ellipse in the drawings, the shape of the power-supply allowable range 21 may be not only an accurate ellipse and a perfect circle, but also an ellipse or a perfect circle including some unevenness, or a rectangular shape including corner portions having a predetermined curvature.

Since a height of the vehicle 2 is changed in accordance with getting on and off of an occupant and loading and unloading of a cargo on the vehicle 2, the gap also fluctuates according to this changed height. When no occupant is getting on the vehicle 2 and no cargo is loaded on the vehicle 2 (this is referred to as "empty car state"), the gap becomes the largest value (Gmax). When the maximum number of the occupants are getting on the vehicle and the maximum weight of the cargo is loaded thereon (this is referred to as "fully occupied state/fully loaded state"), the gap becomes the smallest value (Gmin).

The range which can be taken by the gap (i.e., the maximum value (Gmax) and the minimum value (Gmin) of the gap) can be predicted on the basis of a suspension structure of the vehicle 2, a seating capacity, and the maximum loading capacity. Accordingly, it can be said that the power-supply allowable range 21 is a finite range also in the Z-axial direction. Therefore, a three-dimensional shape in the three-dimensional space shown in FIG. 3 can be defined as the power-supply allowable range 21. The power-supply allowable range 21 includes an upper surface 21a parallel to the X-Y plane in which the maximum value (Gmax) of the gap is a Z-axis component, a lower surface 21b parallel to the X-Y plane in which the minimum value (Gmin) of the gap is the Z-axis component, and a side surface 21c connecting between a peripheral edge of the upper surface 21a and a peripheral edge of the lower surface 21b. The upper surface 21a is narrower than the lower surface 21b, and the side surface 21c is inclined with respect to the Z-axis. The center of the ground-side coil 12 is used as an origin point of the orthogonal coordinate system. Thus, the gap may fluctuate between the maximum value (Gmax) and the minimum value (Gmin) due to getting on and off of an occupant and loading and unloading of a cargo on the vehicle 2. Moreover, when the center 11ca of the vehicle-side coil 11 is positioned on the side surface 21c of the power-supply allowable range 21, the current/voltage sensor 8 will measure the same received voltage as the minimum allowable voltage (V0).

If the gap during executing the alignment between the coils before starting the power supply (i.e., gap before starting power supply) is different from the gap during supplying the power (i.e., gap during power supply), the power may be impossible to be properly supplied. For example, if an occupant is getting on the vehicle 2 or a cargo is loaded thereon during executing the alignment between the coils before starting the power supply, the gap before starting the power supply is relatively small. However, if the occupant has gotten off the vehicle 2 or the cargo has been taken down therefrom, at the time when the power supply is started or immediately after starting the power supply, after the alignment between the coils is completed, the gap during the power supply becomes larger than the gap before starting the power supply. Thus, if the gap during power supply becomes larger than the gap before starting power supply, the power may be impossible to be properly supplied. More specifically, although the center $11ca$ of the vehicle-side coil $11a$ is within the power-supply allowable range 21 at the time of the alignment between the coils, the center $11ca$ of the vehicle-side coil $11a$ may be departed from the power-supply allowable range 21 when subsequently starting the power supply.

Figure 4:
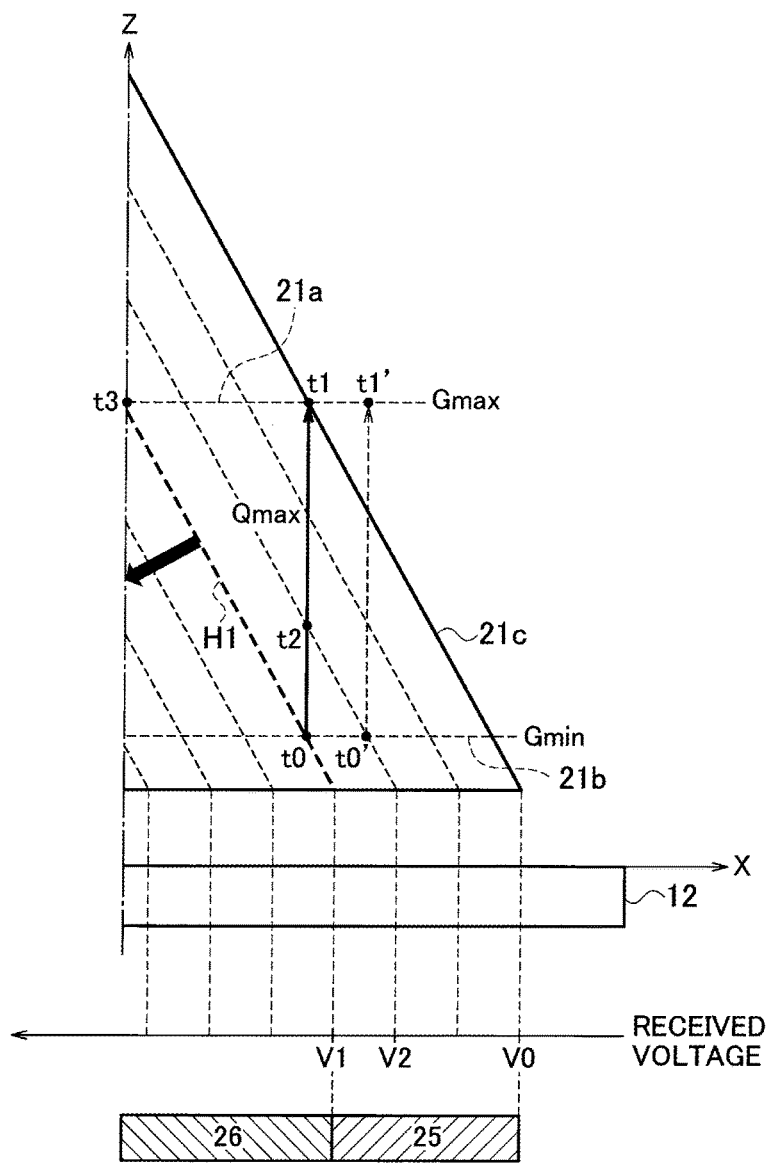
FIG. 4 is a diagram showing a relationship of a change of a center position of a vehicle-side coil 11a and the power-supply allowable range 21 in the case of fluctuating the gap from the minimum value (Gmin) to the maximum value (Gmax).

For example, with reference to FIG. 4, suppose the case where the gap fluctuates from the minimum value (Gmin) to the maximum value (Gmax) by only the maximum fluctuation range (Qmax). FIG. 4 is a diagram showing the power-supply allowable range 21 in the first quadrant of the X-Z plane shown in FIG. 3. The power-supply allowable range 21 shown in FIG. 4 includes an upper surface $21a$ including the maximum value (Gmax) of the gap, a lower surface $21b$ including the minimum value (Gmin) of the gap, and a side surface $21c$ inclined in a direction in which the Z-axis component decreases with the increase in the X-axis component. Each of a plurality of the dashed lines attached to the inside and the outside of the power-supply allowable range 21 indicates a surface (equipotential surface) connecting a position of the center $11ca$ of the vehicle-side coil $11a$ for measuring the same received voltage in the X-Z plane. The equipotential surfaces are parallel to one another, and the equipotential surfaces are parallel also to the side surface $21c$. The further away from the origin point, the smaller the value of the received voltage, and the received voltage indicated by the side surface $21c$ becomes the minimum allowable voltage (V0), as described above. More specifically, if the received voltage is equal to or higher than the minimum allowable voltage (V0), the parking assistance device can determine that the center $11ca$ of the vehicle-side coil $11a$ is positioned within the power-supply allowable range 21. However, it is not necessary to detect or estimate the X-Y-Z coordinate system of the center $11ca$ of the vehicle-side coil $11a$, in the present embodiments. Since a quantity of the received voltages is a scalar quantity, it can estimate a position of the equipotential surface on which the center $11ca$ of the vehicle-side coil $11a$ is positioned, on the basis of the received voltage. However, it is difficult to estimate a position (vector quantity) of the equipotential surface on which the center $11ca$ of the vehicle-side coil $11a$ is positioned.

For example, when the center $11ca$ of the vehicle-side coil 11 is the position t0 at the time of the alignment between the coils, it will fluctuate to the position t1 during executing the wireless power supply. Since the position t1 is within the power-supply allowable range 21, the power can be properly supplied. In contrast, when the center $11ca$ of the vehicle-side coil 11 is the position t0' at the time of the alignment between the coils, it will fluctuate to the position t1' during executing the wireless power supply. The position t1' is out of the power-supply allowable range 21. Accordingly, although the parking assistance device determines that the power can be supplied at the time of the alignment between the coils, subsequently the gap fluctuates during executing the power supply. Therefore, since the coupling coefficient between the coils is reduced and the power supply efficiency is also reduced, the power cannot be properly supplied.

Normally, since it is difficult to exactly detect a getting-on state of an occupant to the vehicle 2 and a loading state of a cargo, it is difficult to exactly measure or estimate the value of the gap. Moreover, although the parking assistance device determines that the power can be supplied at the time of the alignment between the coils, subsequently it should be suppressed that the power supply becomes impossible during executing the power supply since the gap fluctuates. In order to suppress such an incorrect determination of the possibility of the power supplying, it has to be assumed that the gap will fluctuate by the maximum fluctuation range (Qmax). That is, as shown in FIG. 4, it has to align between the coils in a fully occupied state/fully loaded state (Gmin), and subsequently to assume supplying the power in an empty car state (Gmax).

Thus, when assuming the maximum fluctuation range (Qmax), it is necessary to narrow the power-supply allowable range 21 at the time of the alignment between the coils by the potential difference (V1–V0) of the received voltage corresponding to the maximum fluctuation range (Qmax). Specifically, it is necessary to align the center $11ca$ of the vehicle-side coil 11 to a range inside the dotted line H1 where the received voltage at the time of the alignment between the coils is equal to or higher than the voltage (V1). As shown in FIG. 4, when the received voltage at the time of the alignment between the coils is equal to or higher than the minimum allowable voltage V0 and equal to or lower than the voltage V1, the power can be supplied if the gap does not fluctuate, but the power cannot be supplied if the gap fluctuates by the maximum fluctuation range (Qmax). Actually, it is sufficiently assumed that the alignment between the coils may be executed in the empty car state (Gmin). In this case, a range which becomes equal to or higher than the voltage (V1) is only the position t3 shown in FIG. 4, it will be determined that the power cannot be supplied except at the position t3, and therefore the alignment between the coils will be substantially impossible.

Accordingly, the parking assistance device according to the embodiments previously obtains a potential difference between the received voltage (second received voltage) of the vehicle-side coil 11 measured when the alignment between the coils is executed before assisting the alignment between the coils and the received voltage (third received voltage) of the vehicle-side coil 11 measured after the alignment between the coils and the power supply are completed. The fluctuation amount of the gap can be estimated on the basis of the potential difference between the received voltage at the time of the alignment between the coils before the power supply start, and the received voltage after completing of the power supply. Moreover, when assisting the parking, the parking assistance device determines whether or not the power can be supplied, in consideration of the fluctuation amount of the gap (potential difference) in the past. By taking into consideration the fluctuation amount of the gap in the past, it is not necessary to assume the maximum fluctuation range (Qmax) shown in FIG. 4. Accordingly, since the possibility of overestimating the fluctuation range of the gap can be reduced while suppressing erroneous determination of the possibility of the power supplying, the power-supply allowable range can be widely set, and thereby the convenience of the parking can be improved.

Figure 5:
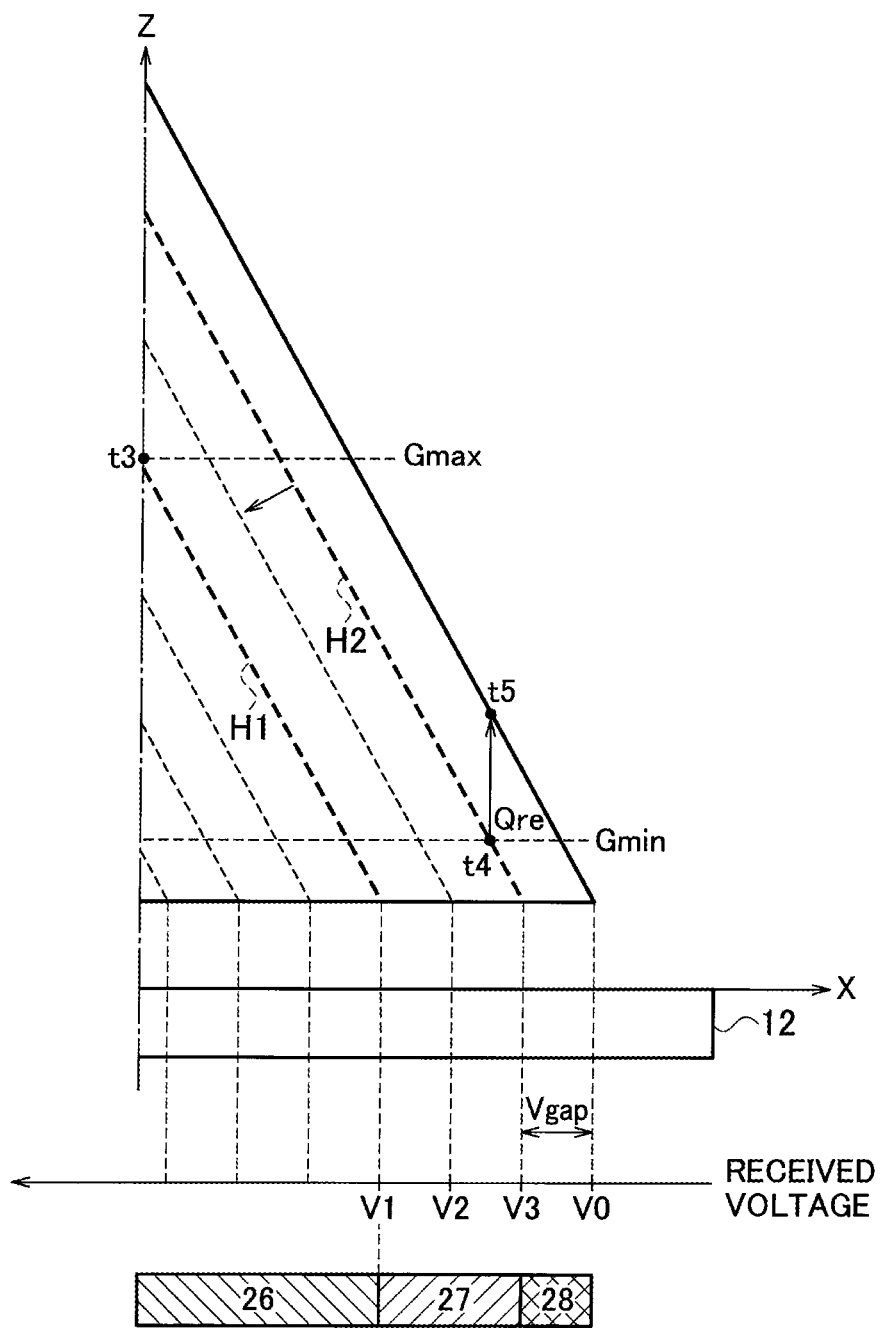
FIG. 5 is a diagram showing a relationship of change of the center position of the vehicle-side coil 11a and the power-supply allowable range 21 in the case of fluctuating the gap from a position t4 to a position t5.

For example, as shown in FIG. 5, a fluctuation amount (Qre) of the gap is estimated on the basis of a potential difference (V3−V0) between the received voltage at the time of the alignment measured in the past (V3) and the received voltage (V0) after completing of the power supply. The received voltage (V3) becomes a threshold value of the received voltage at the time of assisting the alignment by assuming the fluctuation amount (Qre) of the gap, when assisting the alignment between the coils. More specifically, if the received voltage at the time of assisting the alignment is equal to or higher than the voltage (V3), it can be determined that the power can be supplied, since the center 11ca of the vehicle-side coil 11 is within the power-supply allowable range 21 even if a fluctuation of the same amount as the past fluctuation amount (Qre) thereof occurs.

Specifically, the center 11ca of the vehicle-side coil 11 may be aligned to a range inside the dotted line 112 where the received voltage at the time of the alignment between the coils is equal to or higher than the voltage (V3). As shown in FIG. 5, when the received voltage at the time of the alignment between the coils is between V3 to V1 (region 27), the power can be supplied even if the gap fluctuates by the fluctuation amount (Qre). The power-supply allowable range can be widely set since the threshold value (V3) smaller than the threshold value (V1) shown in FIG. 4 can be set by shortening the fluctuation range of the gap to be assumed.

[Parking Assistance Method]

An example of a parking assistance method by means of the parking assistance device will now be explained with reference with FIGS. 6A-6C. First, with reference to FIG. 6A, an operation before starting a wireless power supply will now be explained. The flow chart shown in FIG. 6A corresponds not only to an operation when assisting parking but also to an operation at the time of the alignment between the coils before assisting the parking.

In Step S01, the vehicle controller 4 as a parking assistance device transmits a request of an alignment signal to the ground-side power source box 3 by means of the wireless communication device 6. The ground-side power source box 3 which receives this request starts excitation (excitation for detecting coil position) aiming at the alignment between the coils. The "excitation for detecting coil position" is excitation weaker than main excitation, unlike the main excitation for transmitting the power. Note that since the excitation for detecting coil position is not aimed at charging of the battery 10, the vehicle controller 4 controls to turn off the relay switch 9 to electrically disconnect between the battery 10 and the vehicle-side coil 11.

Proceeding to Step S03, the vehicle controller 4 adds a potential difference (Vgap) of the received voltage previously calculated to the smallest received voltage (threshold value V0) that can be determined that the power can be suppled if there is no gap fluctuation, and calculates a voltage threshold Vth (first reference value). The potential difference (Vgap) is a potential difference between the received voltage measured when the alignment between the coils is executed before assisting the alignment between the coils and the received voltage measured after the alignment between the coils is completed and the power supply is completed, and corresponds to the potential difference (V3−V0) shown in FIG. 5. The voltage threshold Vth corresponds to the voltage V3 shown in FIG. 5.

Proceeding to Step S05, the vehicle 2 approaches a parking space in which the ground-side coil 12 is installed. The received voltage increases as the distance between the coils is decreased. In Step S07, the received voltage (NOW: first received voltage) is continuously measured by means of the current/voltage sensor 8. In addition, when the IGN switch is turned off (YES in S15), the received voltage measured in Step S07 is stored in the vehicle controller 4 as a second received voltage (Vt0).

Proceeding to Step S09, the vehicle controller 4 compares the received voltage (NOW) with the voltage threshold Vth. When the received voltage (NOW) becomes equal to or higher than the voltage threshold Vth due to the approach of the vehicle 2 (YES in S09), since the center 11ca of the vehicle-side coil 11 is within the power-supply allowable range 21 even if gap fluctuation (corresponding to the fluctuation amount Qre shown FIG. 5) corresponding to the potential difference (Vgap) occurs, it can be determined that the power can be supplied. Accordingly, proceeding to Step S11, an image indicating that the power can be supplied is displayed on the display unit 5, and then the process proceeds to Step S15. On the other hand, when the received voltage (NOW) is lower than the voltage threshold Vth (NO in S09), it can be determined that the coil alignment is still insufficient. That is, if a gap fluctuation corresponding to the potential difference (Vgap) occurs, there is a possibility that the center 11ca of the vehicle-side coil 11 may be departed from the power-supply allowable range 21. Accordingly, proceeding to Step S13, an image indicating that the power cannot be supplied is displayed on the display unit 5, and then the process returns to Step S05.

In Step S15, it is determined whether or not the ignition switch (IGN switch) of the vehicle 2 is turned off. If the IGN switch has been turned off (YES in S15), it is determined that the alignment between the coils is completed, and then the process proceeds to Step S17 and starts the power supply. If the IGN switch has been still turned on (NO in S15), it is determined that the alignment between the coils is not completed, and then the process returns to Step S05. The received voltage at the time when the IGN switch is turned off is stored in the vehicle controller 4 as the second received voltage (Vt0).

Next, an operation from starting to stopping of the wireless power supply will now be explained with reference to FIG. 6B. In Step S21, the vehicle controller 4 transmits a request of the power to be supplied to the ground-side power source box 3 by means of the wireless communication device 6, to electrically connect the battery 10 to the vehicle-side coil 11 by controlling to turn on the relay switch 9. The ground-side power source box 3 which receives the request of the power to be supplied starts main excitation for transmitting the power to be supplied.

Proceeding to Step S23, the vehicle controller 4 measures a received power (Pout) by means of the current/voltage sensor 8. In Step S25, the vehicle controller 4 obtains information (Pin) on the transmission power from the ground-side power source box 3, and then calculates power supply efficiency (Eta=Pout/Pin) in Step S27.

Proceeding to Step S29, it is determined whether not the power supply efficiency Eta is equal to or higher than threshold efficiency (Eta_0). If the power supply efficiency Eta is lower than the threshold efficiency (Eta_0) (NO in S29), it can be determined that the power supply efficiency Eta is reduced due to a cause where the vehicle 2 moves during the power supply, a foreign substance enters between the coils, or the like. Accordingly, in Step S33, a request to stop the power transmission is transmitted to the ground-side power source box 3. When the ground-side power source box 3 which receives this request stops the power transmission, the power supply is stopped (S35).

On the other hand, if the power supply efficiency Eta is equal to or higher than the threshold efficiency (Eta_0) (YES in S29), it is determined that the power transmission can be continued, and then the process proceeds to Step S31 to determine whether or not there is a request to stop electrically charging from the user. If there is the request to stop the electrically charging from the user (YES in S31), the process proceeds to Step S33. If there is no request to stop the electrically charging from the user (NO in S31), the process returns to Step S21 in order to continue the power supply.

An operation after stopping the wireless power supply will now be explained with reference to FIG. 6C. When the power transmission is stopped, the vehicle controller 4 firstly controls to turn off the relay switch 9, in Step S41. Consequently, the battery 10 is again electrically disconnected from the vehicle-side coil 11. Proceeding to Step S43, the electric charge stored in a capacitor included in the smoothing unit 7 is discharged. In Step S45, the vehicle controller 4 again transmits a request of an alignment signal to the ground-side power source box 3 by means of the wireless communication device 6. The ground-side power source box 3 which receives this request starts the excitation for detecting coil position aiming at the alignment between the coils.

Proceeding to Step S47, a received voltage (Vt1: third received voltage) is measured by means of the current/voltage sensor 8. The received voltage (Vt1) is compared with the received voltage (Vt0) measured before starting the power supply in FIG. 6A. Since it can be determined that the gap fluctuates between before starting of the power supply and after completing of the power supply if the received voltage (Vt1) is lower than the received voltage (Vt0) (YES in S49), the process proceeds to Step S51, and a potential difference (Vgap) corresponding to the gap fluctuation is set as Vgap=Vt0−Vt1. On the other hand, since it can be determined that the gap does not fluctuate if the received voltage (Vt1) is not lower than the received voltage (Vt0) (NO in S49), the process proceeds to Step S51, and the potential difference (Vgap) corresponding to the gap fluctuation is set as zero.

Figure 6A:
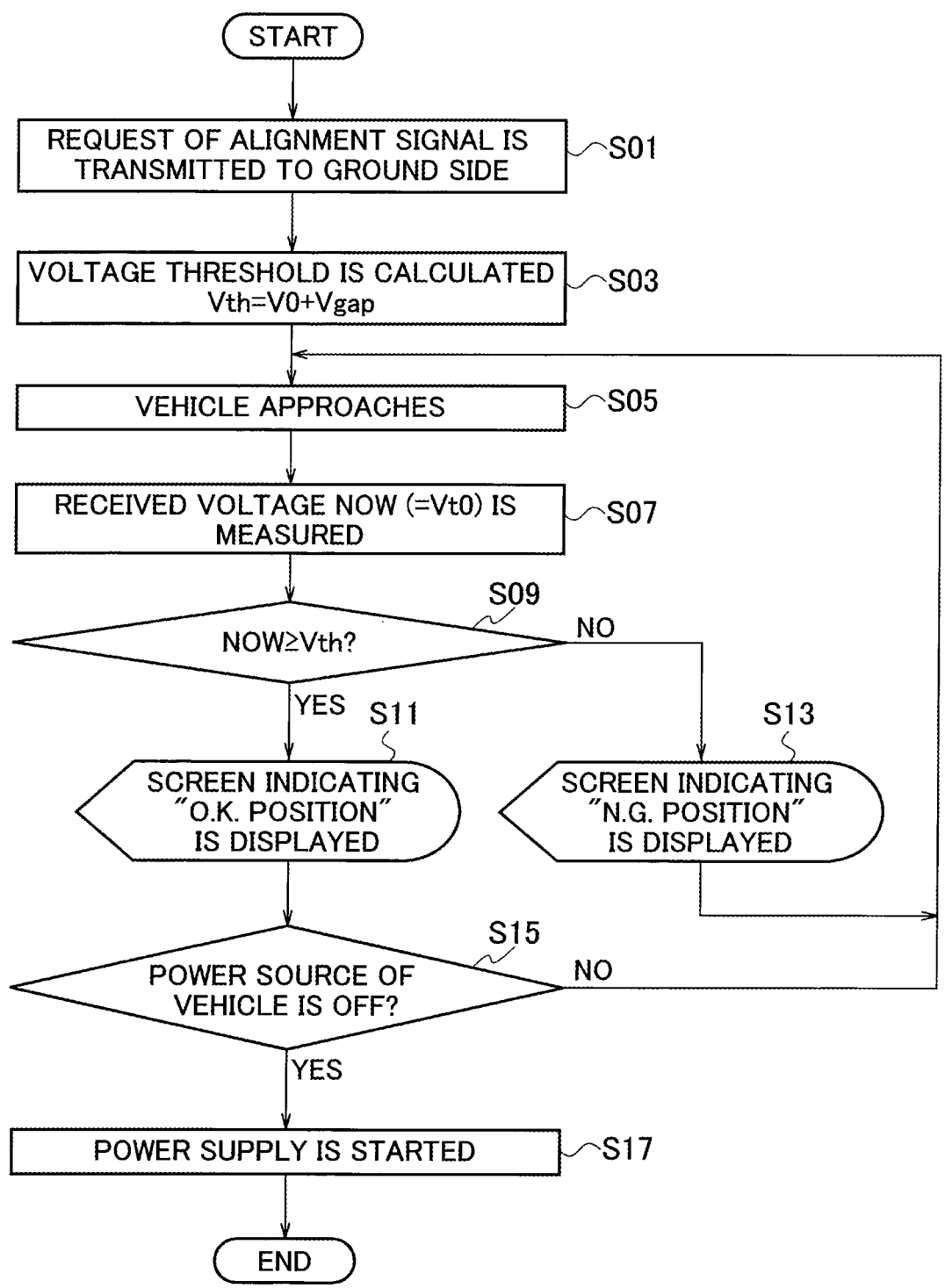
FIG. 6A is a flow chart for explaining an operation before starting a wireless power supply in a first embodiment.
Figure 6B:
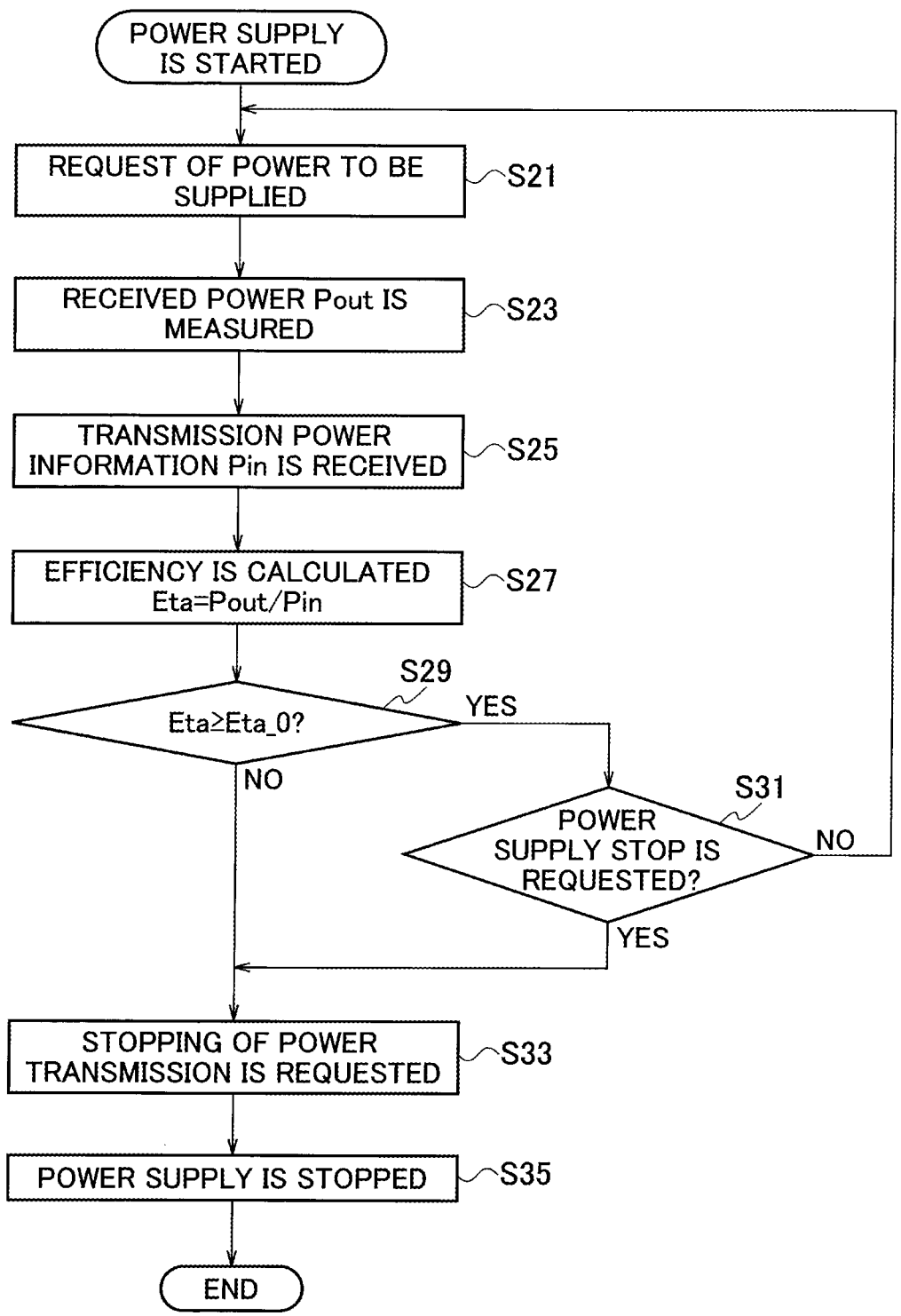
FIG. 6B is a flow chart for explaining an operation from starting to stopping of the wireless power supply in the first embodiment.
Figure 6C:
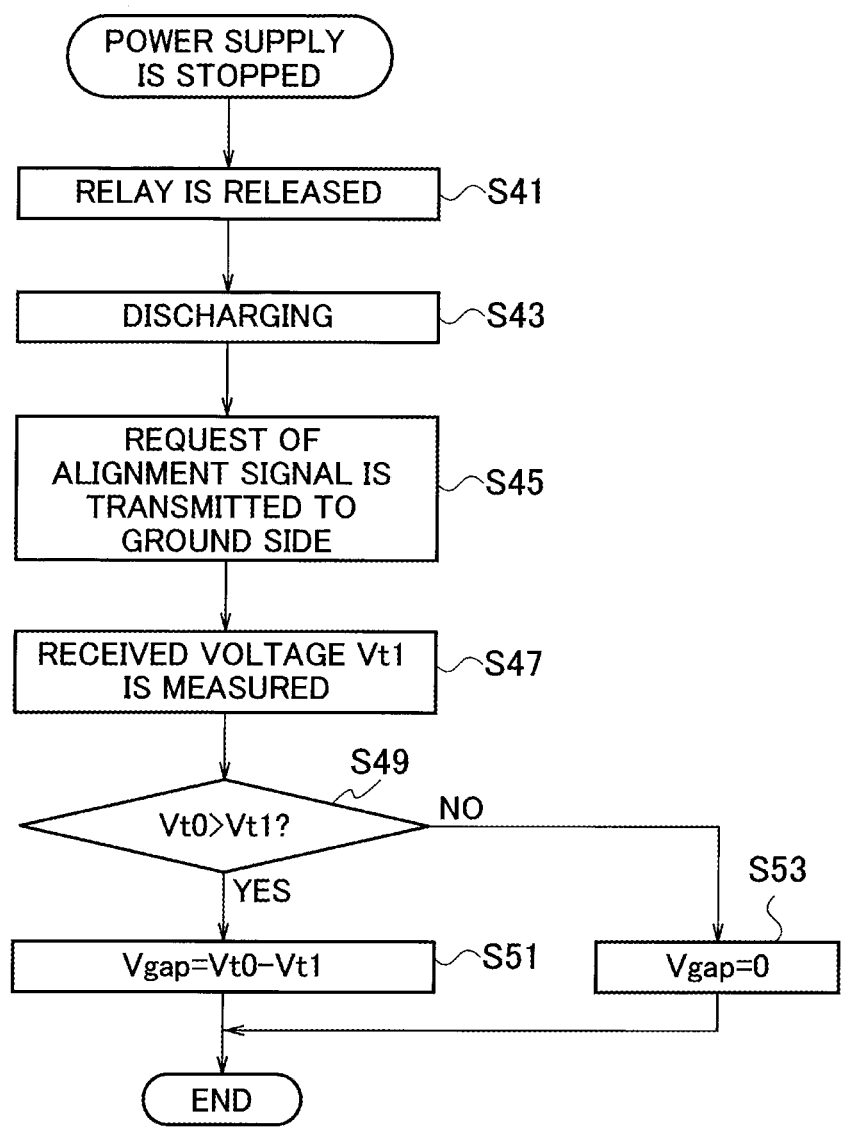
FIG. 6C is a flow chart for explaining an operation after stopping the wireless power supply in the first embodiment.

Thus, the potential difference (Vgap) set in Steps S51 and S53 shown in FIG. 6C is used as the potential difference (Vgap) in Step S03 shown in FIG. 6A at the time of next parking assistance. More specifically, the potential difference (Vgap) between the received voltage (Vt0) measured in Step S07 shown in FIG. 6A and the received voltage (Vt1) measured in Step S47 shown FIG. 6C at the previous time is used as the potential difference (Vgap) in Step S03 shown FIG. 6A at the time of the next parking assistance. The term "parking assistance" used herein means to assist the alignment between the coils before starting the power supply.

The time period 41 shown in FIG. 10 is a time period during executing the alignment between the coils before starting the power supply, in accordance with the flow chart shown in FIG. 6A. During the time period 41, the received voltage (Vt0: second received voltage) at the time when the coil alignment is completed (YES in S15) is measured (S07). Subsequently, during the time period 42, the power is supplied in accordance with the flow chart shown in FIG. 6B. The time period 42 is a time period during supplying the power in accordance with the flow chart shown in FIG. 6B. After the time period 42, the received voltage (Vt1: third received voltage) is measured in accordance with the flow chart shown in FIG. 6C. Consequently, the potential difference (Vgap) can be previously set before the assisting the alignment between the coils.

Subsequently, the alignment between the coils before starting the power supply is assisted in accordance with the flow chart shown in FIG. 6A during the time period 43. At this time, the received voltage (NOW: first received voltage) which is generated in the vehicle-side coil 11 is measured (S07), a possibility of the power reception is determined (S09), and the determination result is presented to the user (occupant) (S11, S13).

As shown in FIG. 10, the time period 43 for executing the parking assistance may simultaneously be the time period 41 for measuring the received voltage (Vt0: second received voltage). That is, the received voltage (Vt0: second received voltage) may be previously measured for the next parking assistance, while executing the parking assistance by measuring the received voltage (NOW: first received voltage). In other words, when assisting the alignment between the coils (time period 43), the received voltage (Vt0: second received voltage) to be used when the assisting of the alignment between the coils next time may be measured. Consequently, the assisting the coil alignment can be repeatedly executed in consideration of the fluctuation amount of the gap at the time of the previous power supply.

Figure 7A:
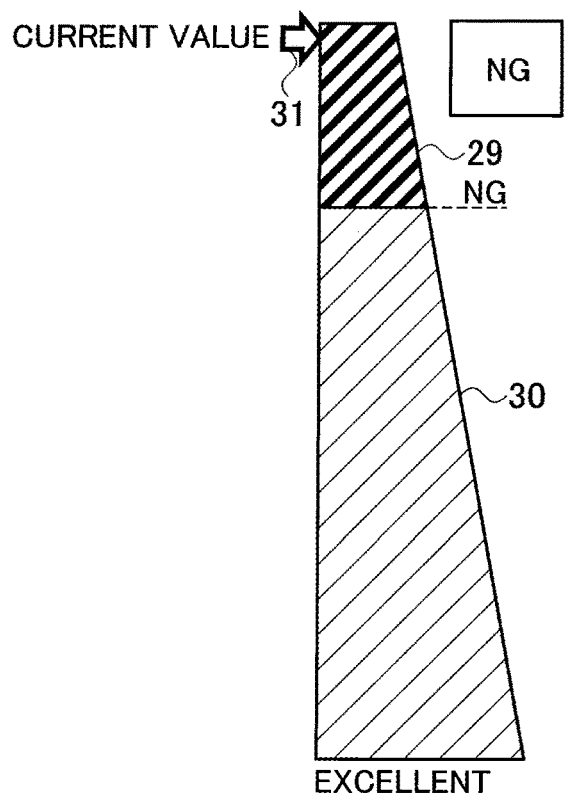
FIG. 7A is a diagram showing an example of an image indicating that the power cannot be supplied (image indicating "N.G. position" (improper position)), displayed on a display unit 5 in Step S13 shown in FIG. 6A.
Figure 7B:
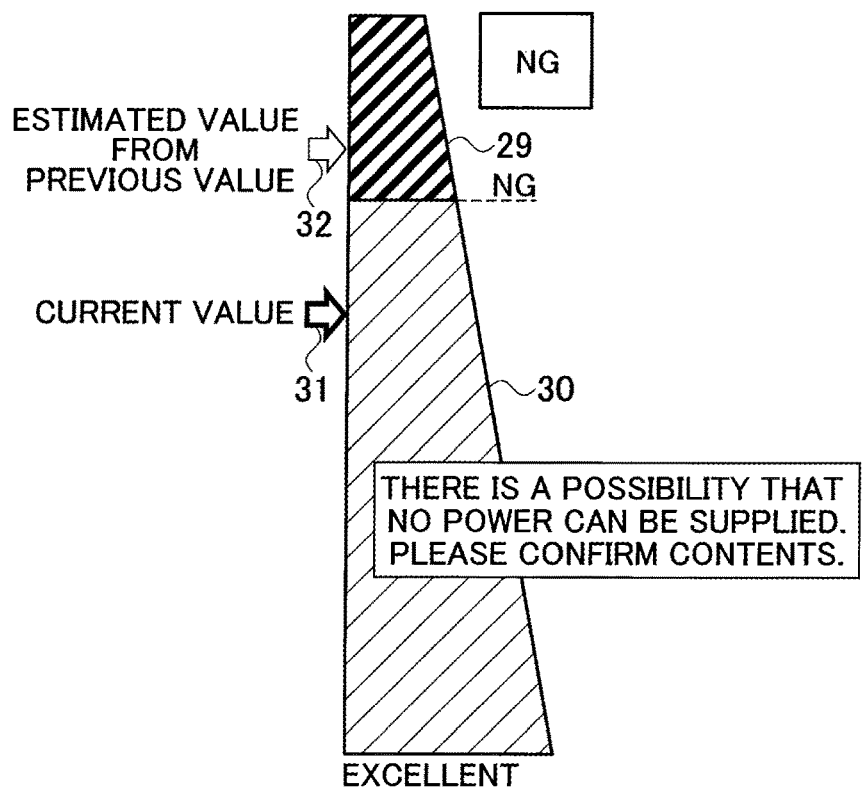
FIG. 7B is a diagram showing an example of an image indicating that the power cannot be supplied (image indicating "N.G. position" (improper position)), displayed on the display unit 5 in Step S13 shown in FIG. 6A.
Figure 7C:
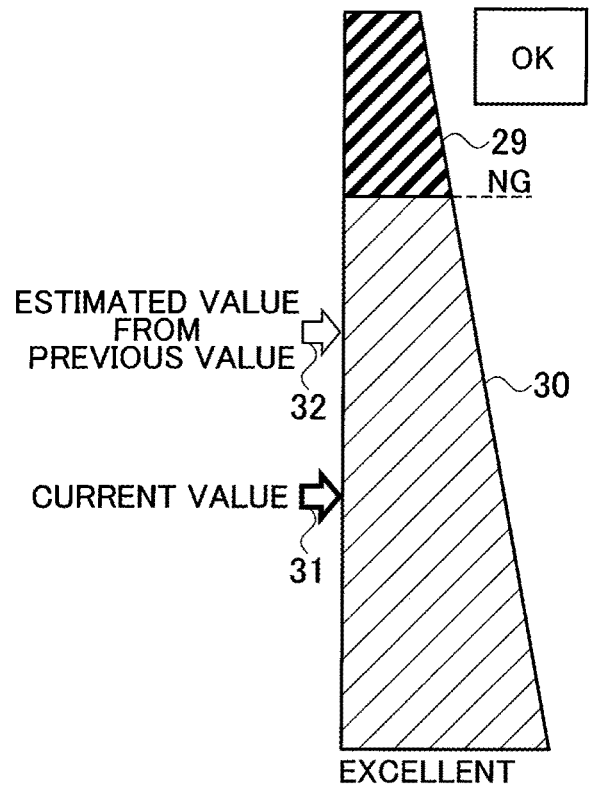
FIG. 7C is a diagram showing an example of an image indicating that the power can be supplied (image indicating "O.K. position" (proper position)), displayed on the display unit 5 in Step S11 shown in FIG. 6A.

Examples of images to be displayed on the display unit 5 in Step S11 and Step S13 shown in FIG. 6A will now be explained. First, FIGS. 7A-7C show examples of images of a level gauge including two regions (29, 30), and first and second arrows 31 and 32 which move in a longitudinal direction along the two regions (29, 30) divided in the longitudinal direction. The two regions includes a power-supply impossible region 29 indicating a region where the power cannot be supplied, and a power-supply possible region 30 indicating a region where the power can be supplied. The boundary between the two regions (29, 30) indicates the minimum received voltage (minimum allowable voltage V0) that can be determined that the power can be supplied, if there is no fluctuation of the gap. In FIG. 7A, the first arrow 31 points the power-supply impossible region 29. The first arrow 31 indicates the currently received voltage (NOW: first received voltage). Since the received voltage (NOW: first received voltage) is lower than the minimum allowable voltage V0, it is indicated that no wireless power supply can be executed, even in a case where it is as in the received voltage currently measured, i.e., there is no fluctuation of the gap. That is, FIG. 7A shows an example of the image indicating "N.G. position" (improper position) displayed in Step S13 shown in FIG. 6A.

In FIG. 7B, the second arrow 32 in addition to the first arrow 31 is displayed. The second arrow 32 indicates a value (second reference value) obtained by subtracting the potential difference (Vgap) calculated at the time of the previous power supply from the currently received voltage (NOW: first received voltage). That is, it indicates a reference value of the received voltage in consideration of the gap fluctuation value (Qre) estimated on the basis of the previous power supplying operation. The interval between the first arrow 31 and the second arrow 32 indicates the potential difference (Vgap) calculated at the time of the previous power supply. The second arrow 32 is moved to the side of the power-supply impossible region 29 from the first arrow 31 only by the amount of the potential difference (Vgap).

In FIG. 7B, although the first arrow 31 indicates the power-supply possible region 30, the second arrow 32 indicates the power-supply impossible region 29. Accordingly, it can be present to the user that the power can be supplied if there is no fluctuation of the gap as remaining the received voltage (NOW) currently measured, but the power cannot be supplied in consideration of the gap fluctuation value estimated from the previous power supplying operation. FIG. 7B shows an example of an image indicating "N.G. position" (improper position) displayed in Step S13 shown in FIG. 6A.

In FIG. 7C both of the first arrow 31 and the second arrow 32 indicate the power-supply possible region 30. FIG. 7C shows an example of an image indicating "O.K. position" (proper position) displayed in Step S11 shown in FIG. 6A. It can be presented to the user that the power can be supplied even in consideration of the gap fluctuation value estimated from the previous power supplying operation.

Thus, the parking assistance device according to the embodiments assists the alignment between the coils by presenting the result of the comparison between the second reference value (second arrow 32) obtained by subtracting from the currently received voltage (NOW: first arrow 31) the potential difference (Vgap) calculated at the time of the previous power supply and the minimum allowable voltage (V0: boundary between the regions 29 and 30), to the occupant. Accordingly, the parking assistance device according to the embodiments can intelligibly present whether or not the power can be supplied.

Figure 8A:
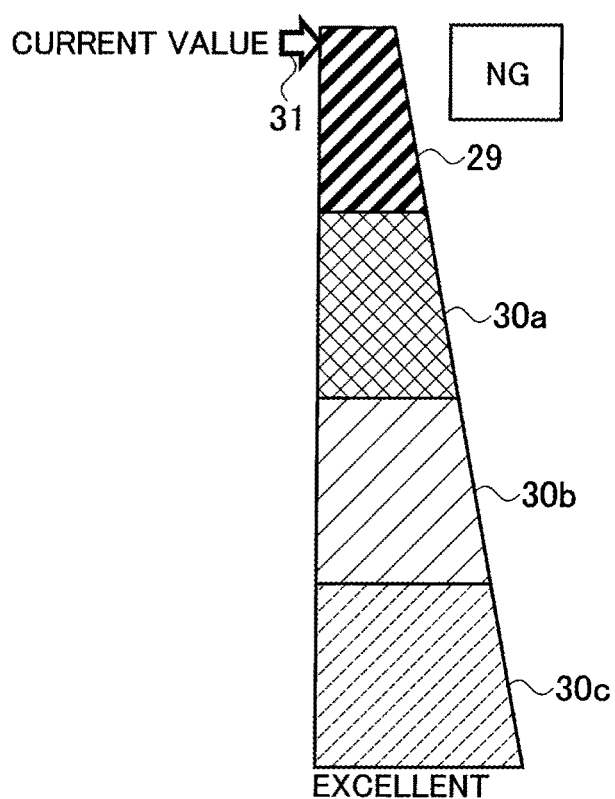
FIG. 8A is a diagram showing another example of an image indicating that the power cannot be supplied (image indicating "N.G. position" (improper position)), displayed on the display unit 5 in Step S13 shown in FIG. 6A.
Figure 8B:
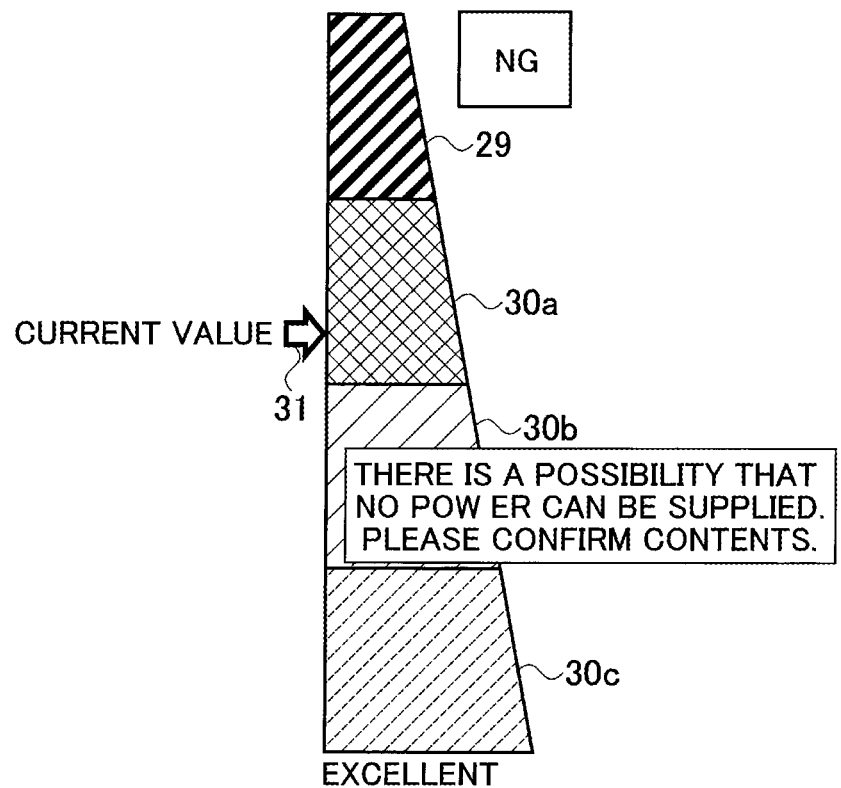
FIG. 8B is a diagram showing another example of an image indicating that the power cannot be supplied (image indicating "N.G. position" (improper position)), displayed on the display unit 5 in Step S13 shown in FIG. 6A.
Figure 8C:
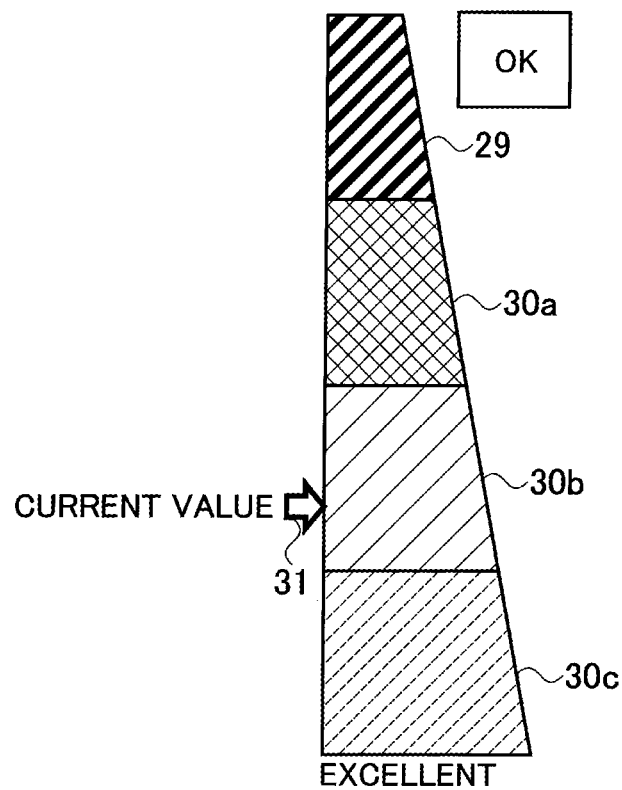
FIG. 8C is a diagram showing another example of an image, indicating that the power can be supplied (image indicating "O.K. position" (proper position)), displayed on the display unit 5 in Step S11 shown in FIG. 6A.

Next, FIGS. 8A-8C show examples of images of a level gauge including four regions (29, 30a, 30b, 30c), and a first arrow 31 which moves in a longitudinal direction along the four regions (29, 30a, 30b, 30c) divided into the longitudinal direction. The four regions includes a first power-supply impossible region 29, a second power-supply impossible regions 30a, a first power-supply possible regions 30b, and a second power-supply possible regions 30c. The first power-supply impossible region 29 indicates that the power cannot be supplied even in a case where there is no fluctuation of the gap as remaining the received voltage (NOW) currently measured. The second power-supply impossible region 30a indicates that the power cannot be supplied, in consideration of the gap fluctuation value estimated from the previous power supplying operation. The first power-supply possible region 30b indicates that the power can be supplied, in consideration of the gap fluctuation value estimated from the previous power supplying operation. The second power-supply possible region 30c indicates that the power can be supplied even in consideration of the maximum fluctuation range (Qmax) of the gap. The first arrow 31 indicates the currently received voltage (NOW: first received voltage).

In FIG. 8A, the first arrow 31 indicates the first power-supply impossible region 29. Accordingly, it is presented to the user that the power cannot be supplied even in a case of remaining the received voltage (NOW) currently measured, i.e., in a case where there is no fluctuation of a gap. That is, FIG. 8A shows an example of the image indicating "N.G. position" (improper position) in Step S13 shown in FIG. 6A.

In FIG. 8B, the first arrow 31 indicates the second power-supply impossible region 30a. Accordingly, it can be presented to the user that the power can be supplied if there is no fluctuation of the gap as remaining the received voltage (NOW) currently measured, but the power cannot be supplied in consideration of the gap fluctuation value estimated from the previous power supplying operation. That is, FIG. 8B shows an example of the image indicating "N.G. position" (improper position) in Step S13 shown in FIG. 6A.

The boundary between the first power-supply impossible region 29 and the second power-supply impossible region 30a indicates the minimum voltage (minimum allowable voltage V0) which can be determined that the power can be supplied, if there is no fluctuation of the gap. The boundary between the second power-supply impossible region 30a and the first power-supply possible region 30b indicates a value (first reference value) obtained by adding the potential difference (Vgap) calculated at the time of the previous power supplying operation to the minimum allowable voltage V0. Accordingly, a width of the second power-supply impossible region 30a indicates the potential difference (Vgap) calculated at the time of the previous power supply.

In FIG. 8C, the first arrow 31 indicates the first power-supply possible region 30b. Accordingly, it can be presented to the user that the power can be supplied in consideration of the gap fluctuation value estimated from the previous power supplying operation. That is, FIG. 8C shows an example of the image indicating "O.K. position" (proper position) in Step S11 shown in FIG. 6A.

Although illustration is omitted, if the first arrow 31 indicates the second power-supply possible region 30c, it can be presented to the user that the power can be supplied even if the same gap fluctuation as the maximum fluctuation range (Qmax) of the gap occurs.

Thus, the parking assistance device assists the alignment between the coils by presenting the result of the comparison between the currently received voltage (NOW: first arrow 31) and the first reference value (boundary between the regions 30a and 30b) obtaining by adding the potential difference (Vgap) calculated at the time of the previous power supply to the minimum voltage (V0: boundary between the regions 29 and 30a) which can be determined that the power can be supplied if there is no fluctuation of the gap, to the occupant. Accordingly, the parking assistance device according to the embodiments can intelligibly present whether or not the power can be supplied.

Figure 9:
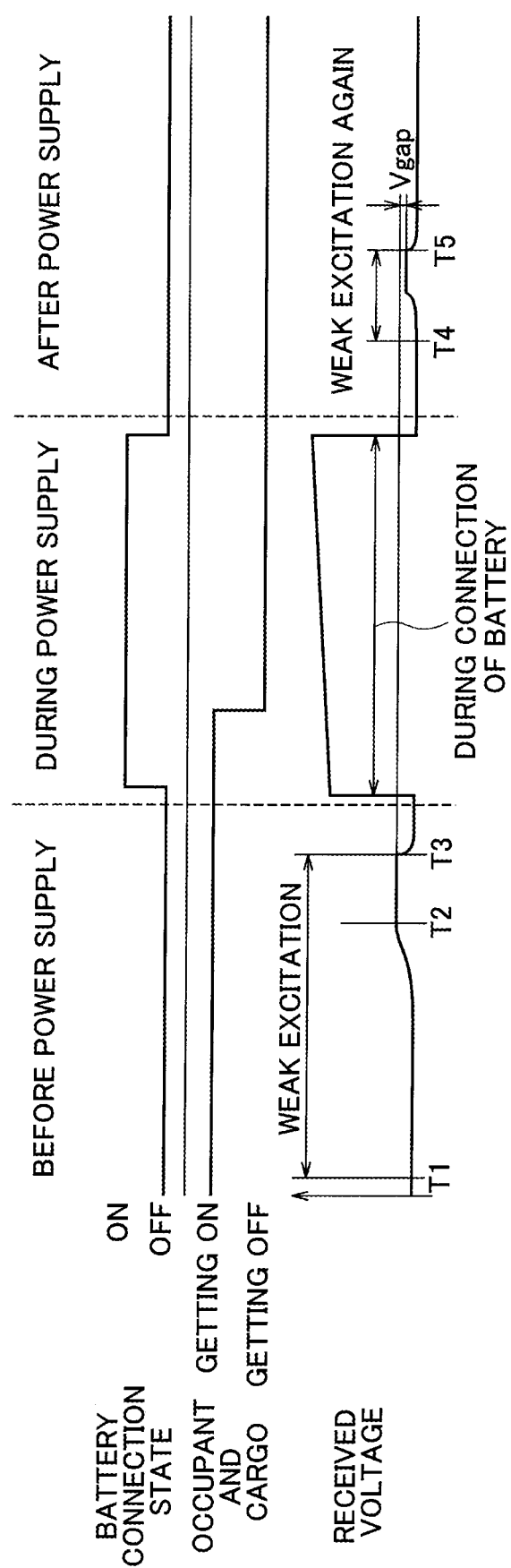
FIG. 9 shows a graphic chart showing a temporal change of: a received voltage (second received voltage Vt0, third received voltage Vt1, first received voltage NOW) measured by a current/voltage sensor 8; getting on and off of an occupant(s) and loading and unloading of a cargo(s); and a battery connection state.

With reference to FIG. 9, the received voltage (Vt1: third received voltage) measured after the power supply will now be explained. The excitation for detecting coil position is started from the time T1 before starting of the power supply, and as the vehicle 2 approaches, the received voltage (NOW) is also increased. The vehicle controller 4 measures the received voltage (Vt0) to be stored, from the time T2 when the vehicle 2 is stopped within the power-supply allowable range to the time T3 when the excitation for detecting coil position is stopped.

At the time when starting of the power supply or after a while after starting of the power supply, it is expected that the occupant gets down and/or the cargo is unloaded from the vehicle 2. As mentioned above, if the gap during executing the alignment between the coils before starting the power supply (i.e., gap before starting power supply) is different from the gap during supplying the power (i.e., gap during power supply), the power may be impossible to be properly supplied. Accordingly, in principle, it is preferable to calculate the potential difference on the basis of both of the received voltage (Vt0) measured before the power supply and the received voltage measured during the power supply.

However, as shown in FIG. 9, at the time of the alignment before the power supply, the relay switch 9 is controlled to be turned off, and thereby the vehicle-side coil 11 is disconnected from the battery 10. On the other hand, since it is necessary to transmit the power to the battery 10 during the power supply, the relay switch 9 is controlled to be turned on, and thereby the vehicle-side coil 11 is connected to the battery 10. Accordingly, the circuit configurations for measuring the received voltage are different between before the power supply and during the power supply. An impedance of the battery 10 largely affects the measurement of the received voltage, and therefore the received voltage is largely dependent on the voltage of the battery 10. Moreover, since the excitation performed during the power supply is stronger than the excitation for detecting coil position performed before the power supply and after the power supply, the received voltage to be measured is also increased. Accordingly, it is difficult to measure the received voltage on the same conditions before the power supply and during the power supply.

Accordingly, the vehicle controller 4 starts the excitation for detecting coil position again from the time T4 when a while has elapsed, after the power supply is completed and the battery 10 is electrically disconnected from the vehicle-side coil 11. The vehicle controller 4 measures the received voltage (Vt1) until the time T5 when the excitation for detecting coil position is stopped. This is because it is assumed that the occupant has still got down and/or the cargo has still been unloaded from the vehicle 2, for a while (T4-T5) after supplying the power for a sufficient long time. Moreover, since the relay switch is controlled to be turned off, the circuit configurations for measuring the received voltage can be made equivalent before the power supply and after the power supply.

As explained above, according to the first embodiment, the following operation/working-effects can be obtained. The fluctuation amount of the gap can be estimated from the potential difference (Vgap) between the received voltage at the time of the coil alignment which is previously obtained, and the received voltage after completing of the power supply. Accordingly, as shown in FIGS. 4 and 5, it can be exactly determined whether or not the power can be supplied, on the basis of the power-supply allowable range (H1, H2) which is changed in accordance with the fluctuation amount of the gap, by determining the possibility of the power supplying on the basis of the potential difference (Vgap) and the received voltage (NOW). Moreover, in consideration of the amount of the gap fluctuation in the past, since the possibility of overestimating the fluctuation range of the gap can be reduced, the power-supply allowable range can be widely set, and thereby the convenience of the parking can be improved.

Second Embodiment

The first embodiment has shown the example of assisting the coil alignment at the time of the next power supply in consideration of the gap fluctuation at the time of the previous power supply. That is, although the gap fluctuation to be referred is only one previous value in the first embodiment, the coil alignment may be assisted in consideration of a plurality of power supplying operations executed in the past.

More specifically, before assisting the alignment between the coils, the parking assistance device previously measures and records a plurality of pairs of the received voltage before the power supply and the received voltage after the power supply (second received voltage Vt0, third received voltage Vt1). Then, when assisting the alignment between the coils, the average value (Vgap_ave) of the plurality of pairs of the potential differences or the maximum value (Vgap_max) of the plurality of pairs of the potential differences may be used as the potential difference (Vgap) previously calculated. Furthermore, it is also possible to simultaneously use the average value (Vgap_ave) and the maximum value (Vgap_max), as the potential difference (Vgap) previously calculated.

The parking assistance device according to the second embodiment assists the alignment between the coils by presenting a possibility of the power supplying determined by simultaneously using the average value (Vgap_ave) and the maximum value (Vgap_max) of the potential difference, to the occupant.

Figure 11A:
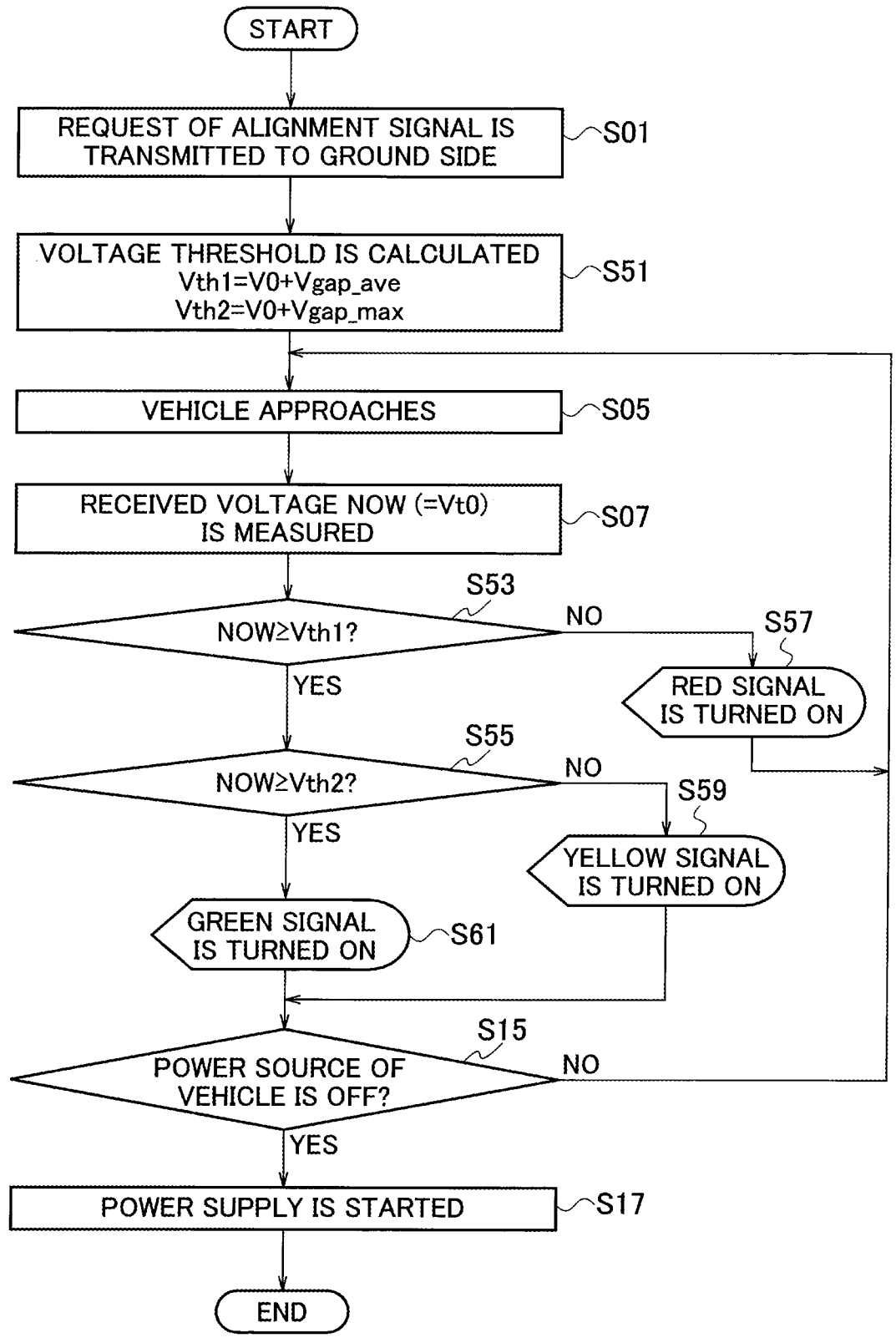
FIG. 11A is a flow chart for explaining an operation before starting a wireless power supply in the second embodiment.

First, the operation examples of before the power supply, during the power supply, and after the power supply in the parking assistance device according to the second embodiment will now be explained, with reference to FIGS. 11A-11C. Among the steps of FIGS. 11A-11C, the same step as the step of FIGS. 6A-6C is denoted by the same reference sign, and the description thereof will be omitted.

First, with reference to FIG. 11A, an operation at the time of the coil alignment before the power supply will now be explained. In Step S51, two voltage thresholds (Vth1 and Vth2) are calculated by means of the average value (Vgap_ave) and the maximum value (Vgap_max) of the potential difference. More specifically, the first voltage threshold (Vth1) is calculated by adding the average value (Vgap_ave) of the potential difference to the threshold value (V0), and the second voltage threshold (Vth2) is calculated by adding the maximum value (Vgap_max) of the potential difference to the threshold value (V0).

The average value (Vgap_ave) and the maximum value (Vgap_max) of the potential difference are respectively the average value and the maximum value of the potential differences in a plurality of power supplying operations executed in the past.

In Step S53, the received voltage (NOW: first received voltage) are compared with the first voltage threshold (Vth1). In Step S55, the received voltage (NOW) are compared with the second voltage threshold (Vth2). If the received voltage (NOW) is equal to or higher than the first voltage threshold (Vth1) and is equal to or higher than the second voltage threshold (Vth2) (YES in S55), a green signal is turned on the display unit 5 (LED). If the received voltage (NOW) is equal to or higher than the first voltage threshold (Vth1) and is lower than the second voltage threshold (Vth2) (NO in S55), a yellow signal is turned on the display unit 5 (LED). If the received voltage (Vt0) is lower than the first voltage threshold (Vth1) (NO in S53), a red signal is turned on the display unit 5 (LED). Although illustration is omitted, the display unit 5 according to the second embodiment includes not the display configured to display the level gauge but at least the LED configured to emit light in red, the LED configured to emit light in yellow, and the LED configured to emit light in green. Such LEDs are mounted on a position where the user (occupant) can visually recognize, e.g., a dashboard of the vehicle 2.

If the red signal is turned on, it can be presented to the occupant that the power cannot be supplied in consideration of the average value (Vgap_ave) of the potential difference. That is, it can be presented to the occupant that the center 11*c* of the vehicle-side coil 11 cannot be kept within the power-supply allowable range 21 if the gap fluctuation equal to or greater than the average value of the gap fluctuation in the past occurs.

If the yellow signal is turned on, it can be presented to the occupant that the power can be supplied in consideration of the average value (Vgap_ave) of the potential difference, but no power can be supplied in consideration of the maximum value (Vgap_max) of the potential difference. That is, it can be presented to the occupant that the center 11*c* of the vehicle-side coil 11 can be kept within the power-supply allowable range 21 if the gap fluctuation equal to or less than the average value of the gap fluctuation in the past occurs.

Moreover, if the gap fluctuation equal to or greater than the average value of the gap fluctuation in the past and equal to or less than the maximum value of the gap fluctuation in the past occurs, it can be presented to the occupant that the center 11c of the vehicle-side coil 11 will be deviated from the power-supply allowable range 21.

If the green signal is turned on, it can be presented to the occupant that the power can be supplied in consideration of the average value (Vgap_ave) and the maximum value (Vgap_max) of the potential differences in the plurality of the power supplying operations executed in the past. That is, it can be presented to the occupant that the center 11c of the vehicle-side coil 11 can be kept within the power-supply allowable range 21 even if the gap fluctuation equal to the maximum value of the gap fluctuation in the past occurs.

Figure 11C:
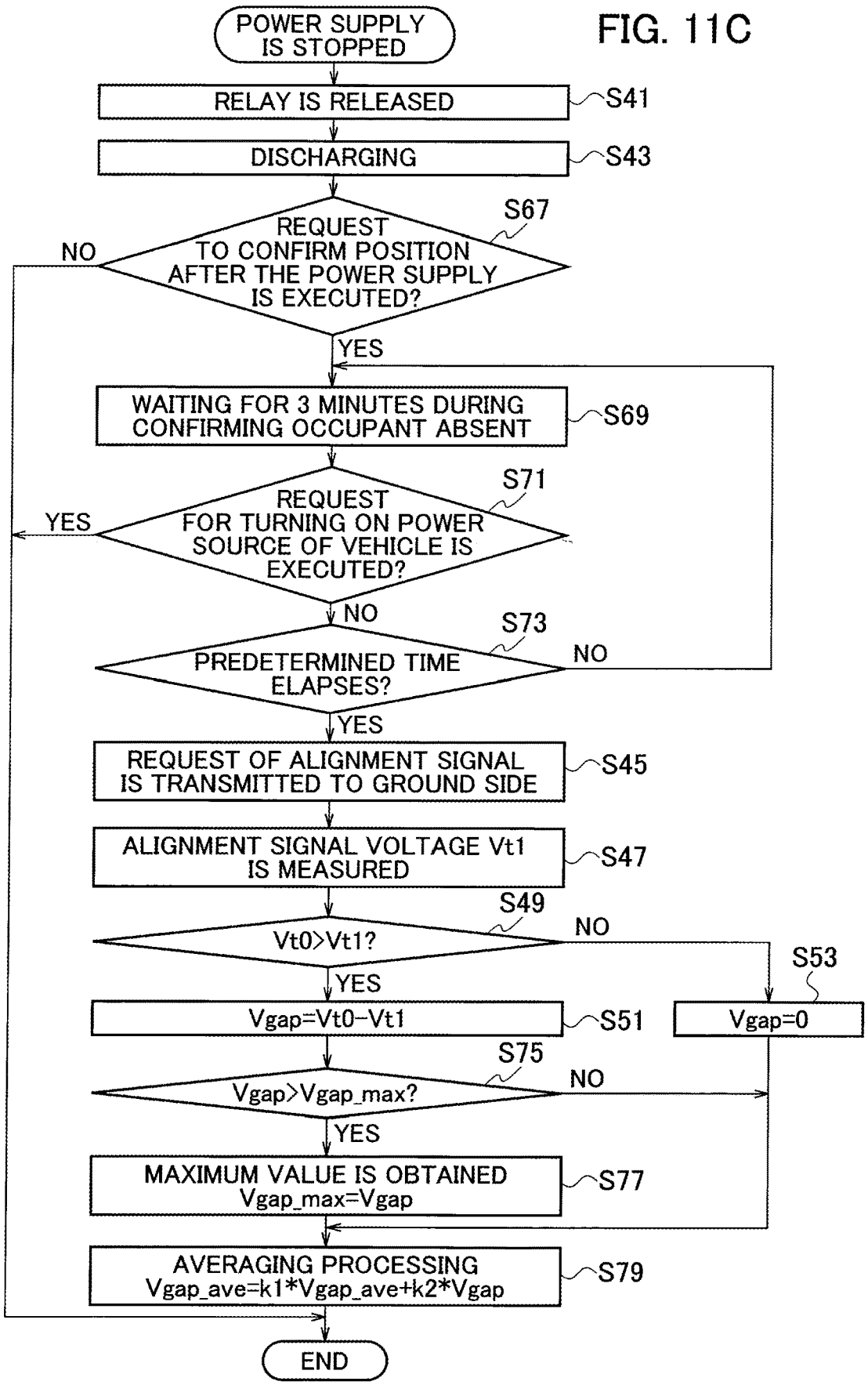
FIG. 11C is a flow chart for explaining an operation after stopping the wireless power supply in the second embodiment.

With reference to FIGS. 11B and 11C, an operation during the power supply and an operation after the power supply will now be explained. In Step S63, the vehicle controller 4 determines whether or not the power supply time is equal to or longer than 30 minutes, if there is no request to stop the electrically charging from the user (NO in S31). If the power supplying operation is less than 30 minutes, since the occupant does not yet get off and the cargo is still loaded during supplying the power, there is a possibility that no gap fluctuation occurs. Accordingly, it is not necessary to measure the received voltage (Vt1) after the power supply. Accordingly, the vehicle controller 4 executes the request to confirm position after the power supply by means of the wireless communication device 6 only when the power is supplied for a sufficient long time (YES in S65).

Then, the vehicle controller 4 measures the received voltage (Vt1) only when the request to confirm position after power the supply is executed in Step S67 shown in FIG. 11C. Consequently, the received voltage at the time of the power supplying operation in which no gap fluctuation occurs (Vt1) can be removed from the calculation of the average value (Vgap_ave). The noise is removed and thereby the computation accuracy of the average value (Vgap_ave) of the potential difference cab be improved.

Furthermore it is determined whether or not the IGN switch remains to be turned off, for a predetermined time after the power supply is completed (e.g., for 3 minutes) (S69 to S73). If the IGN switch is turned on during the predetermined time after the power supply is completed, it is estimated that the occupant already gets on and/or the cargo is loaded thereon at the time of completing of the power supply. Accordingly, the received voltage (Vt1) is measured only when the IGN switch remains to be turned off (YES in S73) for a predetermined time after the power supply is completed (e.g., for 3 minutes). Consequently, the received voltage at the time of the power supplying operation in which no gap fluctuation occurs (Vt1) can be removed from the calculation of the average value (Vgap_ave). The noise is removed and thereby the computation accuracy of the average value (Vgap_ave) of the potential difference cab be improved.

Whether or not the maximum value (Vgap_max) is updated is confirmed based on the potential difference (Vgap) calculated in step S51 (S75, S77). Moreover, in Step S79, the average value (Vgap_ave) is updated on the basis of the potential difference (Vgap).

As explained above, according to the second embodiment, the following operation/working-effects can be obtained. Before assisting the alignment between the coils, the vehicle controller 4 previously measures and records a plurality of pairs of the received voltage before the power supply and the received voltage after the power supply (second received voltage Vt0, third received voltage Vt1). Then, the vehicle controller 4 assists the alignment between the coils by suing the average value (Vgap_ave) of the plurality of pairs of the potential differences or the maximum value (Vgap_max) of the plurality of pairs of the potential differences may be used as the potential difference (Vgap) previously calculated, when assisting the alignment between the coils. Consequently, the fluctuation amount of the gap when assisting the alignment between the coils can be predicted with sufficient accuracy.

Modified Example

The modified example of the second embodiment will now explain an example of displaying an image indicating "N.G. position" (improper position) or an image indicating "O.K. position" (proper position) by means of a display mounted on the dashboard of the vehicle 2, in a similar manner to the first embodiment, instead of the display unit 5 (LEDs).

Figure 12A:
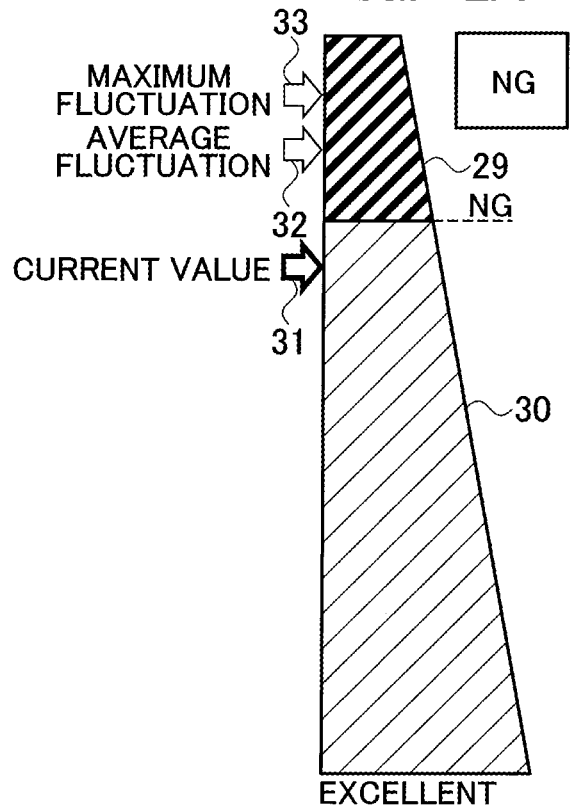
FIG. 12A is a diagram showing an example of an image indicating that the power cannot be supplied (image indicating "N.G. position" (improper position)), displayed on the display unit 5 in Step S57 shown in FIG. 11A.
Figure 12B:
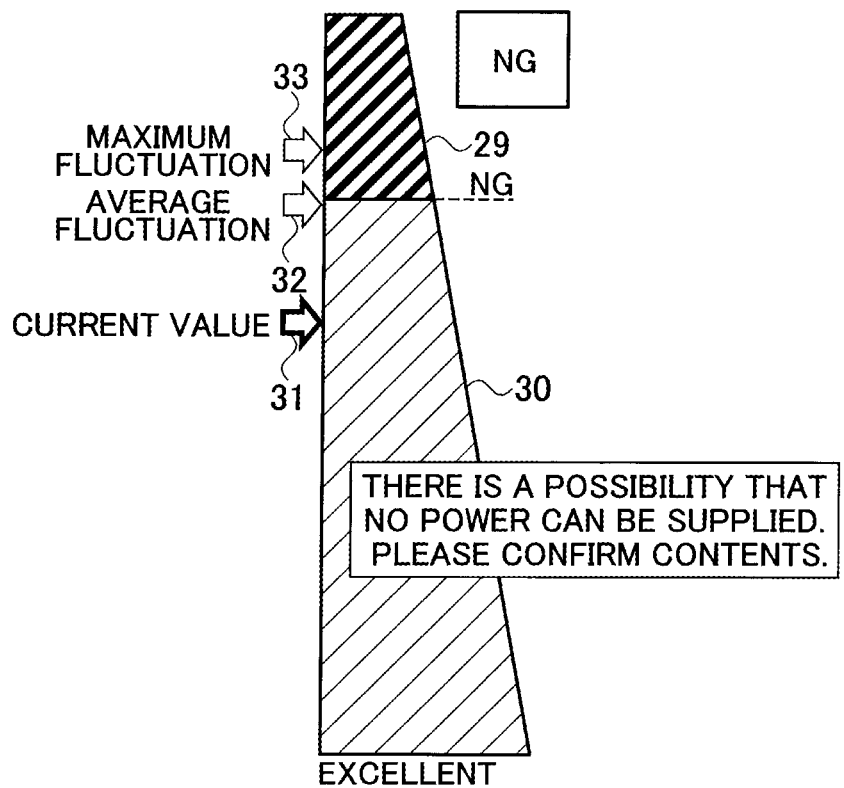
FIG. 12B is a diagram showing an example of an image indicating that the power can be supplied (image indicating "O.K. position" (proper position)), displayed on the display unit 5 in Step S59 shown in FIG. 11A.
Figure 12C:
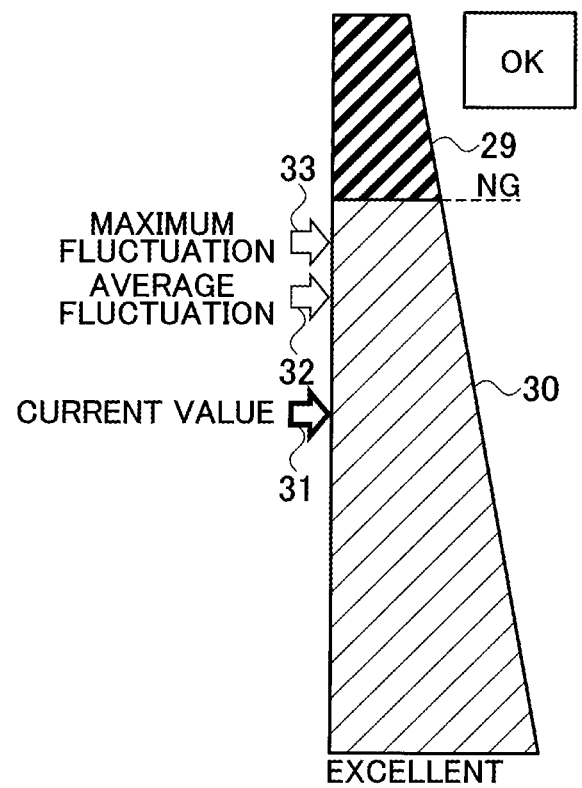
FIG. 12C is a diagram showing an example of an image indicating that the power can be supplied (image indicating "O.K. position" (proper position)), displayed on the display unit 5 in Step S61 shown in FIG. 11A.

Examples of images to be displayed on the display unit 5 in Steps S57, S59, and S61 shown in FIG. 11A will now be explained. First, FIGS. 12A-12C show examples of images of a level gauge including two regions (29, 30), and first to third arrows 31, 32, and 33 which move in a longitudinal direction along the two regions (29, 30) divided in the longitudinal direction. The two regions includes a power-supply impossible region 29 indicating a region where the power cannot be supplied, and a power-supply possible region 30 indicating a region where the power can be supplied. The boundary between the two regions (29, 30) indicates the minimum received voltage (minimum allowable voltage V0) that can be determined that the power can be supplied, if there is no fluctuation of the gap. The first arrow 31 indicates the currently received voltage (NOW: first received voltage). The second arrow 32 indicates a value (second reference value) obtained by subtracting the average value (Vgap_ave) of the potential difference from the currently received voltage (NOW: first received voltage). The third arrow 33 indicates a value (third reference value) obtained by subtracting the maximum value (Vgap_max) of the potential difference from the currently received voltage (NOW: first received voltage). That is, the second arrow 32 and the third arrow 33 respectively indicate the received voltages in consideration of the average value and the maximum value of gap fluctuation which are respectively estimated from the plurality of the power supplying operations in the past. The interval between the first arrow 31 and the second arrow 32 indicates the average value (Vgap_ave) of the potential difference. The interval between the first arrow 31 and the third arrow 33 indicates the maximum value (Vgap_max) of the potential difference.

In FIG. 12A, the first arrow 31 points the power-supply possible region 30, and the second arrow 32 and the third arrow 33 point the power-supply impossible region 29. Accordingly, it can be presented to the user that the power can be supplied if there is no fluctuation of the gap as remaining the received voltage (NOW) currently measured, but the power cannot be supplied in consideration of the average value and the maximum value of the gap fluctuations respectively estimated from the plurality of the power supplying operations in the past. FIG. 12A corresponds to the lighting-on state of the red signal in Step S57 shown FIG. 11A.

In FIG. 12B, each of the first arrow 31 and the second arrow 32 points the power-supply possible region 30, and the third arrow 33 points the power-supply impossible region 29. Consequently, according to the display image shown in FIG. 12B, it can be presented to the user that the power can be supplied even if the gap fluctuation equal to or less than the average value of gap fluctuation occurs, but no power can be suppled if the gap fluctuation equal to or greater than the average value of the gap fluctuation occurs. FIG. 12B corresponds to the lighting-on state of the yellow signal in Step S59 shown FIG. 11A.

In FIG. 12C, all the first arrows 31, the second arrows 32, and third arrows 33 point the power-supply possible region 30. Consequently, according to the display image shown in FIG. 12C, it can be presented to the user that the power can be supplied even if the same gap fluctuation as the maximum value of the gap fluctuations respectively estimated from the plurality of the power supplying operations in the past occurs. FIG. 12C corresponds to the lighting-on state of the green signal in Step S61 shown FIG. 11A.

Thus, the parking assistance device assists the alignment between the coils by presenting the result of the comparison between the second reference value (the second arrow 32 and the third arrow 33) obtained by respectively subtracting the average value (Vgap_ave) and the maximum value (Vgap_max) of the potential difference from the currently received voltage (first arrow 31) and the minimum received voltage (V0: boundary between the regions 29 and 30) that can be determined that the power can be supplied if there is no fluctuation of the gap, to the occupant. Accordingly, the parking assistance device according to the embodiments can intelligibly present whether or not the power can be supplied.

Figure 13A:
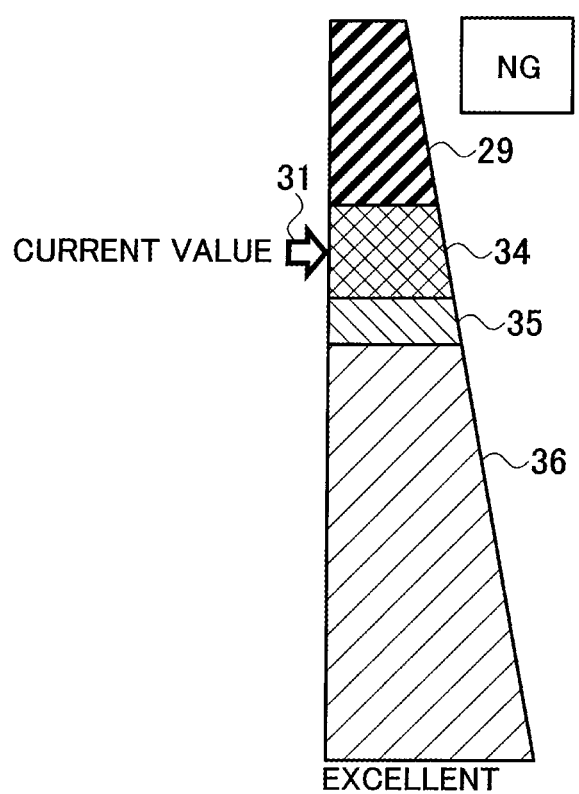
FIG. 13A is a diagram showing another example of an image indicating that the power cannot be supplied (image indicating "N.G. position" (improper position)), displayed on the display unit 5 in Step S57 shown in FIG. 11A.

Next, FIGS. 13A-13C show examples of images of a level gauge including four regions (29, 34, 35, 36), and a first arrow 31 which moves in a longitudinal direction along the four regions (29, 34, 35, 36) divided into the longitudinal direction. The four regions includes a first power-supply impossible region 29, a second power-supply impossible regions 34, a first power-supply possible regions 35, and a second power-supply possible regions 36. The first power-supply impossible region 29 indicates that the power cannot be supplied even in a case where there is no fluctuation of the gap as remaining the received voltage (NOW) currently measured. The second power-supply impossible region 34 indicates that the power cannot be supplied, in consideration of the average value of the gap fluctuations estimated from the plurality of the power supplying operations in the past. The first power-supply possible region 35 indicates that the power can be supplied in consideration of the average value of gap fluctuations, but no power can be supplied in consideration of the maximum value of the gap fluctuations in the plurality of the power supplying operations in the past. The second power-supply possible region 36 indicates that the power can be supplied even in consideration of the maximum of the gap fluctuations.

The boundary between the first power-supply impossible region 29 and the second power-supply impossible region 34 indicates the minimum allowable voltage V0. The boundary between the second power-supply impossible region 34 and the first power-supply possible region 35 indicates the value (first reference value) obtained by adding the average value (Vgap_ave) of the potential difference to the minimum allowable voltage V0. The boundary between the first power-supply possible region 35 and the second power-supply possible region 36 indicates the value (first reference value) obtained by adding the maximum value (Vgap_max) of the potential difference to the minimum allowable voltage V0.

In FIG. 13A, the first arrow 31 points the second power-supply impossible region 34. FIG. 13A presents the user that the power can be supplied in a case where it is as in the received voltage (NOW) currently measured, but no power can be supplied if the gap fluctuation which is the average value (Vgap_ave) of the potential difference occurs. FIG. 13A corresponds to the lighting-on state of the red signal in Step S57 shown FIG. 11A.

In FIG. 13B, the first arrow 31 points the first power-supply possible region 35. FIG. 13B presents the user that the power can be supplied even if the gap fluctuation which is the average value (Vgap_ave) of the potential difference occurs, but no power can be supplied if the gap fluctuation which is the maximum value (Vgap_max) of the potential difference occurs. FIG. 13B corresponds to the lighting-on state of the yellow signal in Step S59 shown FIG. 11A.

In FIG. 13C, the first arrow 31 points the second power-supply possible region 36. FIG. 13C presents the user that the power can be supplied even if the gap fluctuation which is the maximum value (Vgap_max) of the potential difference occurs. FIG. 13C corresponds to the lighting-on state of the green signal in Step S61 shown FIG. 11A.

Thus, the parking assistance device assists the alignment between the coils by presenting the result of the comparison between the currently received voltage (NOW: first arrow 31) and the first reference value (boundary between the regions 34 and 35) obtained by adding the average value (Vgap_ave) of the potential difference to the minimum received voltage (V0: boundary between the regions 29 and 34) that can be determined that the power can be supplied if there is no fluctuation of the gap, to the occupant. Accordingly, the parking assistance device according to the embodiments can intelligibly present whether or not the power can be supplied.

The parking assistance device assists the alignment between the coils by presenting the result of the comparison between the currently received voltage (NOW: first arrow 31) and the first reference value (boundary between the regions 35 and 36) obtained by adding the maximum value (Vgap_max) of the potential difference to the minimum received voltage (V0: boundary between the regions 29 and 34) that can be determined that the power can be supplied if there is no fluctuation of the gap, to the occupant. Accordingly, the parking assistance device according to the embodiments can intelligibly present whether or not the power can be supplied.

Although the foregoing descriptions have been provided for the contents of the present invention on the basis of the embodiments, the present invention is not limited to what have been described, and it is obvious to those skilled in the art that various modifications and improvements can be made to the present invention.

As shown in FIG. 10, in the first and second embodiments, the time period 43 for executing the parking assistance except for first-time is simultaneously the time period 41 for measuring the received voltage (Vt0: second received voltage). The present invention is not limited to this example. That is, only when selected by the user, the received voltage (i.e., the second received voltage Vt0, the third received voltage Vt1) may be measured. For example, a mode selection switch for switching ON/OFF of an estimation mode for estimating the gap fluctuation value is provided on a dashboard. Only when the mode selection switch is operated by the user and thereby the estimation mode is set to ON, the received voltage (the second received voltage Vt0, the third received voltage Vt1) may be measured and stored. Consequently, in the first embodiment, the possibility of power supplying is determined on the basis of the latest potential difference in the potential differences (Vgap) detected in a state where the estimation mode is in ON state. In the second embodiment, the possibility of power supplying is determined on the basis of the average value (Vgap_ave) and the maximum value (Vgap_max) calculated by using all the potential differences (Vgap) detected in a state where the estimation mode is in ON state. Accordingly, since the user oneself can determine the estimated value of the gap fluctuation used at the time of the parking assistance in accordance with the utilization situation of the vehicle 2, user convenience can be improved.

The parking assistance device (control unit) can be realized by means of a microcomputer including a central processing unit (CPU), a memory, and an input and output unit. A computer program for functioning the microcomputer as the parking assistance device is installed in the microcomputer in order to be executed therein. Thereby, such a microcomputer can be functioned as the parking assistance device. Although the example of realizing the parking assistance device by means of software is shown herein, it is naturally also possible to prepare hardware for exclusive use for executing each information processing shown hereinafter to configure, to the parking assistance device. Moreover, a plurality of circuits included in the parking assistance device may be configured with individual hardware. Furthermore, the parking assistance device may also serve as an electronic control unit (ECU) used for other control in connection with the vehicle. The vehicle controller 4 (control unit) shown in FIG. 1 is exemplified as such an electronic control unit (ECU) used for other control in respect of the vehicle 2.

REFERENCE SIGNS LIST

2 Vehicle
4 Vehicle controller (control unit)
8 Current/voltage sensor (voltage sensor)
11 Vehicle-side coil (receiving coil)
12 Ground-side coil (power transmission coil)
32 Second arrow (second reference value)
33 Third arrow (second reference value)
NOW First received voltage
Vgap Potential difference
Vgap_ave Average value of potential difference
Vgap_max Maximum value of potential difference
Vt0 Second received voltage
Vt1 Third received voltage
V0 Minimum allowable voltage

The invention claimed is:

1. A parking assistance method for assisting alignment between coils when parking a vehicle in a parking space provided with a power transmission coil, the power transmission coil being configured to supply power in a wireless manner to a receiving coil, the receiving coil being mounted in the vehicle, the parking assistance method comprising:
measuring a first received voltage generated in the receiving coil when the power transmission coil is excited for detecting a coil position;
calculating a first reference value by adding a potential difference previously calculated before measuring the first received voltage, to a smallest voltage generated in the receiving coil indicating that the power can be supplied if there is no fluctuation of a gap in a vertical direction;
determining whether or not the power can be supplied, by comparing the first reference value and the first received voltage; and
assisting the alignment between the coils by presenting to a vehicle occupant a result of the determining whether or not the power can be supplied, wherein
the previously calculated potential difference is calculated by subtracting (1) a third received voltage of the receiving coil measured after the alignment and the power supply are completed and during a period from a time when the vehicle is stopped within a power-supply allowable range to a time when an excitation for detecting a coil position is stopped, from (2) a second received voltage of the receiving coil measured when the alignment between the coils is executed and another excitation for detecting a coil position is started and during a period from a time when the vehicle is stopped within the power-supply allowable range to a time when the another excitation for detecting the coil position is stopped before assisting the alignment between the coils.

2. The parking assistance method according to claim 1, wherein
a plurality of pairs of the second received voltage and the third received voltage are measured before assisting the alignment between the coils, and
the previously calculated potential difference is an average value of potential differences between the plurality of pairs thereof measured.

3. The parking assistance method according to claim 1, wherein
a plurality of pairs of the second received voltage and the third received voltage are measured before assisting the alignment between the coils, and
the previously calculated potential difference is a maximum value of potential differences between the plurality of pairs thereof measured.

4. The parking assistance method according to claim 1, wherein
assisting the alignment between the coils includes measuring the second received voltage to be used when assisting the alignment between the coils next time.

5. A parking assistance device configured to assist alignment between coils when parking a vehicle in a parking space provided with a power transmission coil, the power transmission coil being configured to supply power in a wireless manner to a receiving coil, the receiving coil being mounted in the vehicle, the parking assistance device comprising:
a voltage sensor configured to measure a first received voltage generated in the receiving coil; and
a control unit configured to assist the alignment between the coils by presenting to a vehicle occupant a result of determining whether or not the power can be supplied on the basis of (1) a potential difference previously calculated before measuring the first received voltage and the first received voltage, wherein
the previously calculated potential difference is calculated by subtracting (1) a third received voltage of the receiving coil measured after the alignment and the power supply are completed and during a period from a time when the vehicle is stopped within a power-supply allowable range to a time when an excitation for detecting a coil position is stopped, from (2) a second received voltage of the receiving coil measured when the alignment between the coils is executed and another excitation for detecting the coil position is started during a period from a time when the vehicle is stopped within the power-supply allowable range to a time when the another excitation for detecting the coil position is stopped before assisting the alignment between the coils.

6. A parking assistance method for assisting alignment between coils when parking a vehicle in a parking space provided with a power transmission coil, the power transmission coil being configured to supply power in a wireless manner to a receiving coil, the receiving coil being mounted in the vehicle, the parking assistance method comprising:
  measuring a first received voltage generated in the receiving coil when the power transmission coil is excited for detecting a coil position;
  calculating a second reference value by subtracting a potential difference from the first received voltage;
  determining whether or not the power can be supplied, by comparing the second reference value and a smallest voltage generated in the receiving coil indicating that the power can be supplied if there is no fluctuation of a gap in a vertical direction; and
  assisting the alignment between the coils by presenting to a vehicle occupant a result of the determining whether or not the power can be supplied, wherein
  the potential difference is calculated by subtracting (1) a third received voltage of the receiving coil measured after the alignment and the power supply are completed and during a period from a time when the vehicle is stopped within a power-supply allowable range to a time when an excitation for detecting a coil position is stopped, from (2) a second received voltage of the receiving coil measured when the alignment between the coils is executed and another excitation for detecting a coil position is started and during a period from a time when the vehicle is stopped within the power-supply allowable range to a time when the another excitation for detecting the coil position is stopped before assisting the alignment between the coils.

7. The parking assistance method according to claim 6, wherein
  a plurality of pairs of the second received voltage and the third received voltage are measured before assisting the alignment between the coils, and
  the potential difference is an average value of potential differences between the plurality of pairs thereof measured.

8. The parking assistance method according to claim 6, wherein
  a plurality of pairs of the second received voltage and the third received voltage are measured before assisting the alignment between the coils, and
  the potential difference is a maximum value of potential differences between the plurality of pairs thereof measured.

9. The parking assistance method according to claim 6, wherein
  assisting the alignment between the coils includes measuring the second received voltage to be used when assisting the alignment between the coils next time.

* * * * *